United States Patent
Iyer et al.

(10) Patent No.: US 10,938,875 B2
(45) Date of Patent: Mar. 2, 2021

(54) MULTI-PROCESSOR/ENDPOINT DATA DUPLICATING SYSTEM

(71) Applicant: Dell Products L.P., Round Rock, TX (US)

(72) Inventors: Shyamkumar T. Iyer, Austin, TX (US); Timothy M. Lambert, Austin, TX (US); William Price Dawkins, Lakeway, TX (US); John Christopher Beckett, New Braunfels, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/396,320

(22) Filed: Apr. 26, 2019

(65) Prior Publication Data

US 2020/0344283 A1 Oct. 29, 2020

(51) Int. Cl.
| | | |
|---|---|---|
| H04L 29/08 | (2006.01) | |
| H04L 29/06 | (2006.01) | |
| H04L 12/855 | (2013.01) | |
| H04L 12/761 | (2013.01) | |

(52) U.S. Cl.
CPC ........ *H04L 65/605* (2013.01); *H04L 29/0854* (2013.01); *H04L 45/16* (2013.01); *H04L 47/2466* (2013.01); *H04L 65/4076* (2013.01); *H04L 67/1095* (2013.01)

(58) Field of Classification Search
CPC ... H04L 65/605; H04L 45/16; H04L 47/2466; H04L 65/4076
USPC ........................................................ 709/231
See application file for complete search history.

(56) References Cited

U.S. PATENT DOCUMENTS

| | | | |
|---|---|---|---|
| 6,157,967 A | 12/2000 | Horst et al. | |
| 7,672,224 B2 | 3/2010 | Asako | |
| 10,346,337 B1* | 7/2019 | Johnson | ............. G06F 13/4022 |
| 2019/0102236 A1* | 4/2019 | Sur | ........................ G06F 9/3004 |
| 2019/0205278 A1* | 7/2019 | Panian | ................ G06F 12/0833 |

FOREIGN PATENT DOCUMENTS

JP 2005196490 A 7/2005

OTHER PUBLICATIONS

Matt Jones, Quick Intro to Parallel Computing R, Jul. 25, 2017, 10 Pages, https://nceas.github.io/oss-lessons/parallel-computing-in-r/parallel-computing-in-r.html.

* cited by examiner

*Primary Examiner* — Glenford J Madamba
(74) *Attorney, Agent, or Firm* — Haynes and Boone, LLP

(57) ABSTRACT

A multi-endpoint adapter device includes a plurality a duplicator device that is coupled to the network port and the plurality of endpoint subsystems that are each configured to couple with a respective processing subsystem. The duplicator device receives, via the network port, a data payload and determines that the data payload is to be provided to each of a first processing subsystem via a first endpoint subsystem that is included in the plurality of endpoint subsystems, and a second processing subsystem via a second endpoint subsystem that is included in the plurality of endpoint subsystems. The duplicator device then duplicates the data payload to provide a first duplicated data payload and a second duplicated data payload. The duplicator device then provides the first duplicated data payload to the first endpoint subsystem and provides the second duplicated data payload to the second endpoint subsystem.

20 Claims, 17 Drawing Sheets

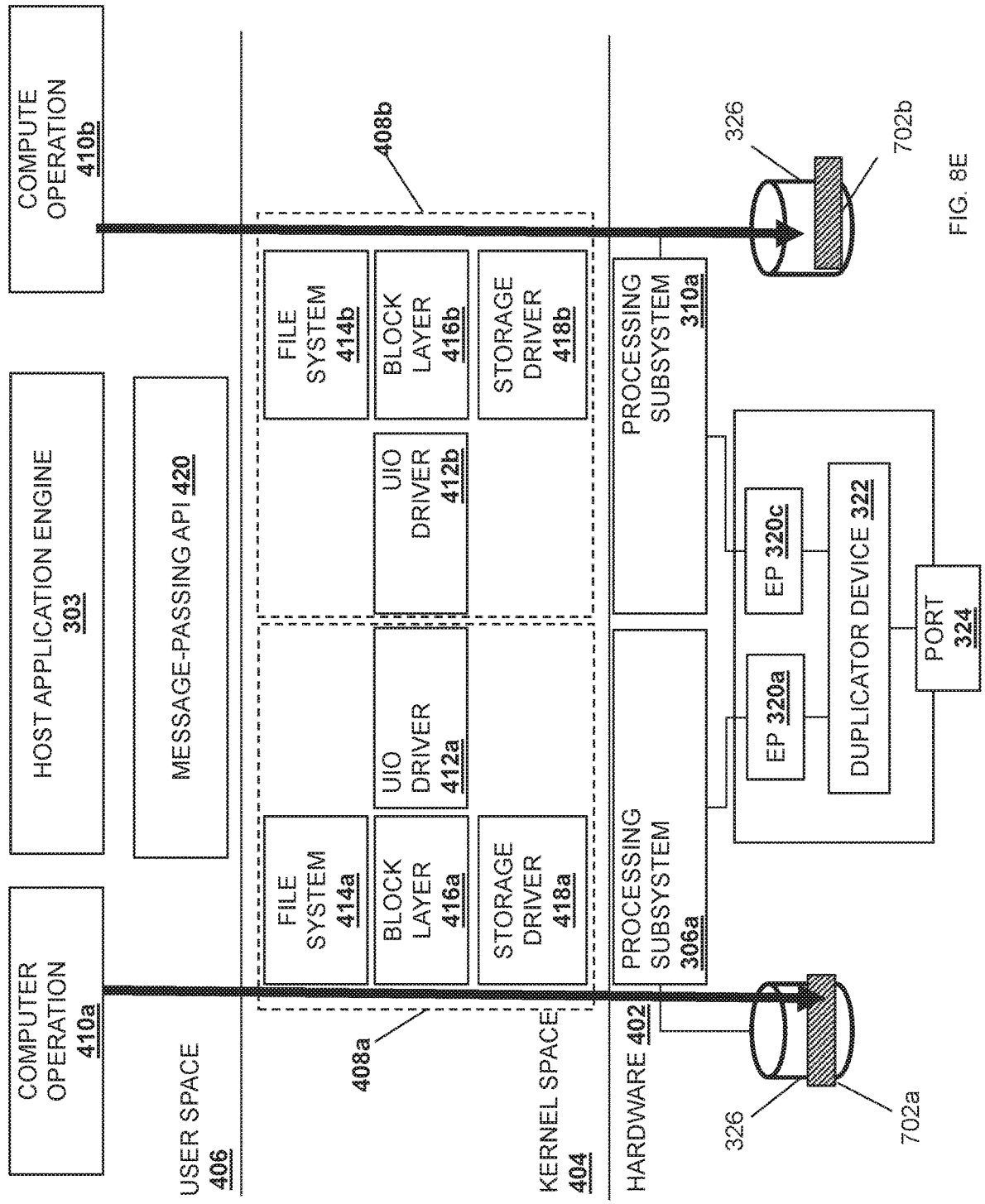

MULTI-PROCESSOR/ENDPOINT DATA DUPLICATING SYSTEM

BACKGROUND

The present disclosure relates generally to information handling systems, and more particularly to duplicating data between processor and endpoint combinations in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, server devices, are sometimes utilized to process network data streams. In some embodiments, network data streams are processed by server devices that include multiple processors and that utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL® Corporation of Santa Clara, Calif., United States) that allow the processors to access memory that is local to the other processors. When such processors process the network data streams, sets of processors may be dedicated to process particular network data streams in parallel such that each processor process a copy of that network data stream at substantially the same time. In the absence of a parallel data streamer, the parallel processing may be accomplished by copying the network data stream that was received by one processor to the local memory provided for each of the other processor(s) via the UPIs. Each processor responsible for processing the network data stream may then process its copy of the network data stream. As such, conventional network data stream processing incurs latency, bandwidth costs; and other inefficiencies associated with; for example; the communication of the network data stream between the processors via the UPIs, as well as other issues that will be apparent to one of skill in the art in possession of the present disclosure.

Accordingly, it would be desirable to provide an improved multi-processor data stream processing system.

SUMMARY

According to one embodiment, an Information Handling System (IHS) includes a processing system; a memory system that is coupled to the processing system and that includes instructions that, when executed by the processing system, cause the processing system to provide a duplicator engine that is configured to: receive, via a network port, a data payload; determine that the data payload is to be provided to each of a first processing subsystem via a first endpoint subsystem that is included in a plurality of endpoint subsystems that are provided by a multi-endpoint adapter device, and a second processing subsystem via a second endpoint subsystem that is included in the plurality of endpoint subsystems that are provided by the multi-endpoint adapter device; duplicate the data payload to provide a first duplicated data payload and a second duplicated data payload; provide the first duplicated data payload to the first endpoint subsystem; and provide the second duplicated data payload to the second endpoint subsystem.

BRIEF DESCRIPTION OF THE DRAWINGS

FIG. 8E is a schematic view illustrating an embodiment of the duplication of a network data stream in the multi-processor/endpoint data duplicating system provided by the stack implementation in the server device of FIG. 4 and during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
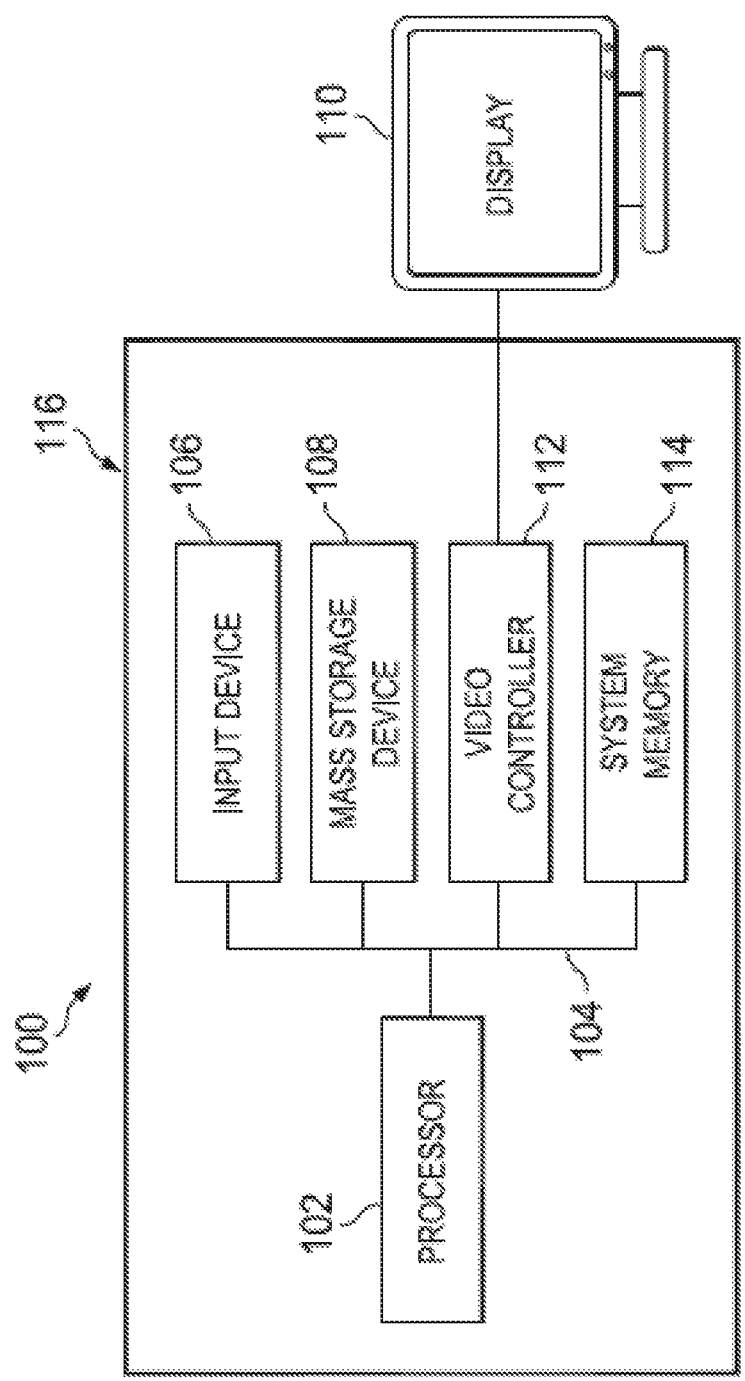
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
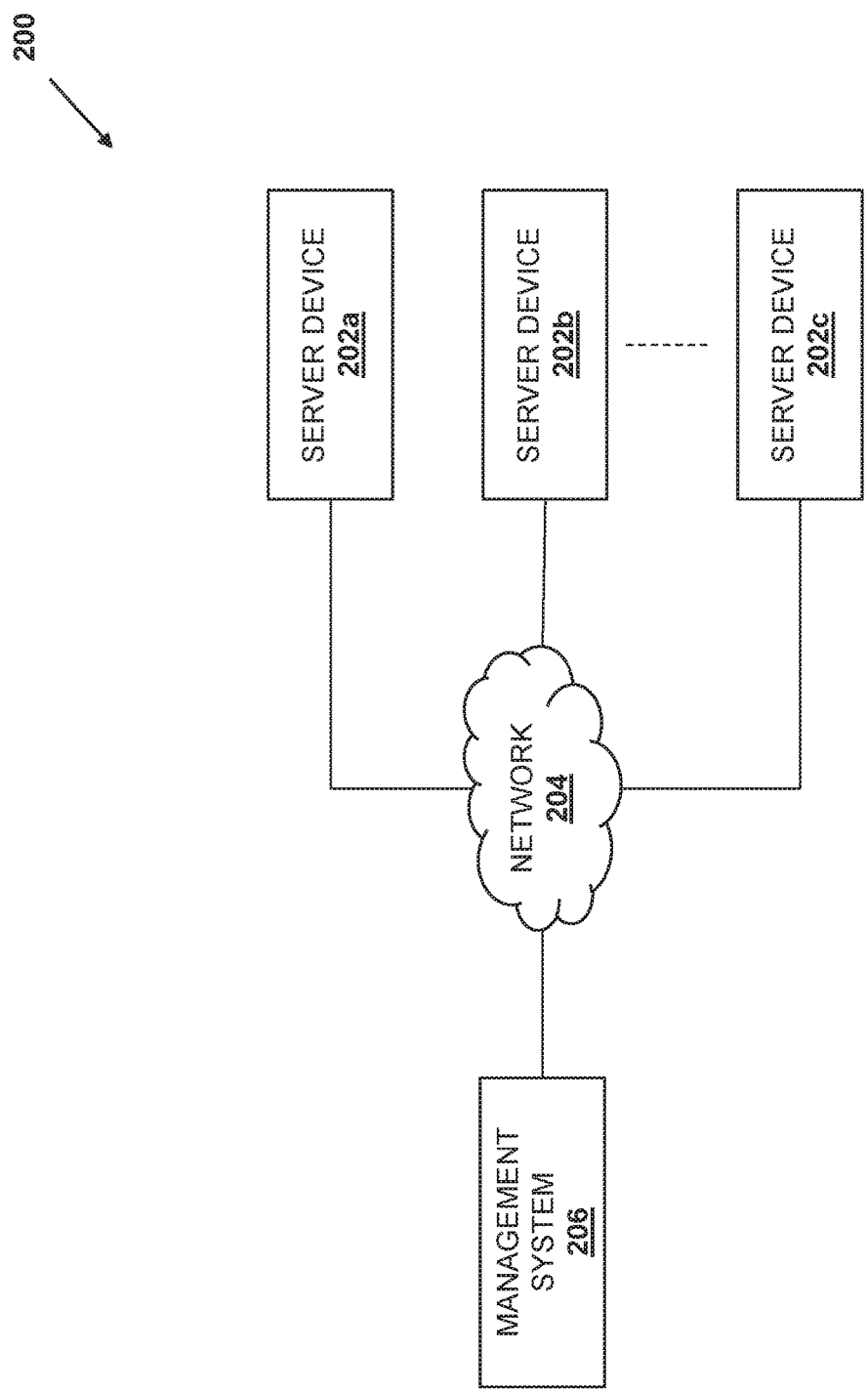
FIG. 2 is a schematic view illustrating an embodiment of a networked system including a plurality of server devices coupled to a management system via a network.

Referring now to FIG. 2, an embodiment of a networked system 200 is illustrated. In the illustrated embodiment, the networked system 200 includes a plurality of server devices 202a, 202b, and up to 202c. In an embodiment, any or all of the server devices 202a-202c may be provided by the IHS 100 discussed above with reference to FIG. 1, and/or may include some or all of the components of the IHS 100. However, while illustrated and discussed as server devices, one of skill in the art in possession of the present disclosure will recognize that the multi-processor/endpoint data duplicating system of the present disclosure may be provided in any device that may be configured to operate similarly as discussed below. The server devices 202a-c are coupled to a network 204 that may be provided by a Local Area Network (LAN), the Internet, and/or other networks known in the art. A management system 206 is also coupled through the network 204 to the server devices 202a-c. The management system 206 may be provided by the IHS 100 discussed above with reference to FIG. 1, and/or may include some or all of the components of the IHS 100. In specific examples, the management system 206 may be provided by server devices, desktop computing devices, laptop/notebook computing devices, tablet computing devices, mobile phones, and/or any other device that may provide the management system functionality discussed below. While a few particular devices are illustrated, one of skill in the art in possession of the present disclosure will recognize that many more devices may (and typically will) be provided in the networked system 200 (e.g., in a datacenter) while remaining within the scope of the present disclosure. Furthermore, while a specific networked system 200 has been illustrated and described, one of skill in the art in possession of the present disclosure will recognize that the multi-processor/endpoint data duplicating system of the present disclosure may include a variety of components and component configurations while remaining within the scope of the present disclosure as well.

Figure 3:
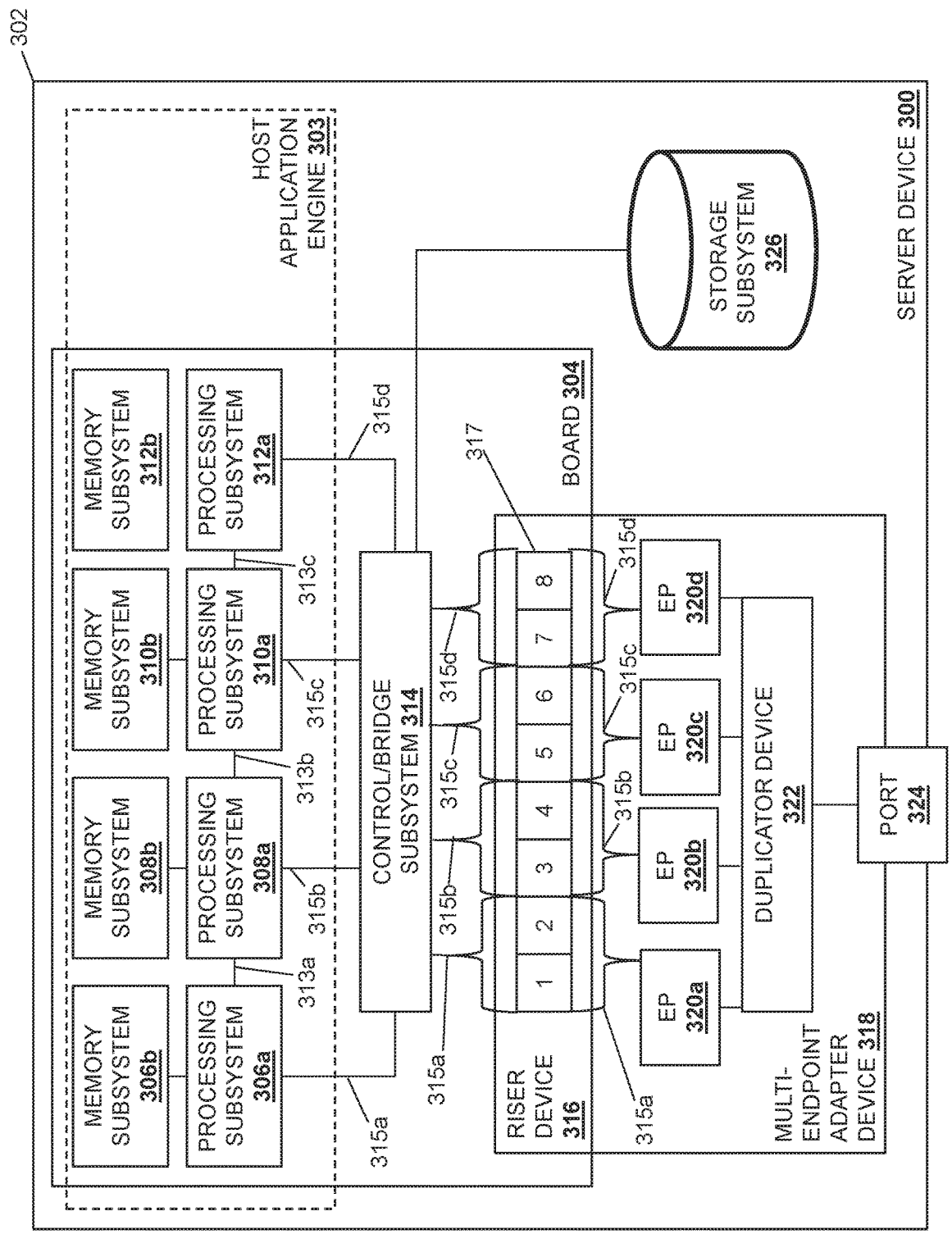
FIG. 3 is a schematic view illustrating an embodiment of a server device that may be included in the networked system of FIG. 2, and that may provide the multi-processor/endpoint data duplicating system of the present disclosure.

Referring now to FIG. 3, an embodiment of a server device 300 is illustrated that may provide any of the server devices 202a-c discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. For example, in other embodiments the server device 300 may be a client device, a combination of a client device and a server device, and/or other devices that would be apparent to one of skill in the art in possession of the present disclosure. In the illustrated embodiment, the server device 300 includes a chassis 302 that houses the components of the server device 300, only some of which are illustrated below. For example, the chassis 302 may house a host application processing system (which may include the processor 102 discussed above with reference to FIG. 1 provided in one or more of the processing subsystems discussed below) and a host application memory system (which may include the memory 114 discussed above with reference to FIG. 1 provided in one or more of the memory subsystems discussed below) that is coupled to the host application processing system and that includes instructions that, when executed by the host application processing system, cause the host application processing system to provide a host application engine 303 that is configured to perform the functionality of the host application engines and/or host application subsystems discussed below.

The chassis 302 may also house a board 304 such as, for example, a motherboard and/or other circuit board that would be apparent to one of skill in the art in possession of the present disclosure. In the illustrated embodiment, a plurality of processing subsystems are provided on the board 304 and include a processing subsystem 306a, a processing subsystem 308a, a processing subsystem 310a, and a processing subsystem 312a, with the processing subsystems coupled together via processing subsystem interconnects such as Inter-Chip Global Memory Interconnect (xGMI) available in processing systems provided by AMD® of Santa Clara, Calif., United States, Global Memory Connect (GMI) available in processing systems provided by AMD®, Ultra-Path Interconnects (UPIs) available in processing systems provided by INTEL® Corporation of Santa Clara, Calif., United States, etc., and/or any other processing interconnect that would be apparent to one of skill in the art in possession of the present disclosure. For example, in the illustrated embodiment, the processing subsystems 306a and 308a are coupled together via a processing subsystem interconnect 313a, the processing subsystems 308a and 310a are coupled together via a processing subsystem interconnect 313b, and the processing subsystems 310a and 312a are coupled together via a processing subsystem interconnect 313c.

Furthermore, each of the processing subsystems 306a, 308a, 310a, and 312a are provided with and connected to respective memory subsystems 306b, 308b, 310b, and 312b. For example, the processing subsystems and memory subsystems in the server device 300 may utilize a Non-Uniform Memory Access (NUMA) computer memory design in which each respective processing subsystem is connected to a respective local memory subsystem to provide a respective NUMA node (i.e., the processing subsystem 306a and its local memory subsystem 306b provide a first NUMA node, the processing subsystem 308a and its local memory subsystem 308b provide a second NUMA node, and so on.) However, while four processing subsystems/memory subsystems (e.g., four NUMA nodes) are illustrated in FIG. 3, one of skill in the art in possession of the present disclosure will recognize that more or fewer processing subsystems/memory subsystems (e.g., NUMA nodes) may be provided according to the teachings of the present disclosure will falling within its scope as well. In the example illustrated in FIG. 3, the host application processing system may include one or more of the NUMA nodes that operate (via processing subsystem(s) executing instructions on their respective memory subsystem(s)) to provide the host application engine 303.

In the illustrated embodiment, each of the processing subsystems 306a, 308a, 310a, and 312a are coupled to a control/bridge subsystem 314 that may be provided on the board 304. While illustrated and described as a control/bridge subsystem, one of skill in the art in possession of the present disclosure will recognize that other subsystems (e.g., a PCIe switch) may perform the functionality of the control/bridge subsystem 314 discussed below while remaining within the scope of the present disclosure as well. In the illustrated embodiment; the control/bridge subsystem 314 may be provided by hardware on the board 304 that is coupled to a riser device 316 that is included on the board 304. However, in other embodiments; the control/bridge subsystem 314 may be provided as part of the riser device 316 while remaining within the scope of the present disclosure as well. In various examples, the coupling between the control/bridge subsystem 314 and the riser device 316 may be configurable (i.e., modifiable) or non-configurable (e.g., having a set coupling configuration). In different embodiments; the riser device 316 may include one or more connectors 317. For example, in the illustrated embodiment, the connector(s) 317 include two ×16 connectors (e.g., PCIe connectors) that are provided by the eight ×4 connectors illustrated in FIG. 3 (e.g., numbered "1", "2", "3", and "4" for the first ×16 connector, and "5", "6", "7", and "8" for the second ×16 connector). However, one of skill in the art in possession of the present disclosure will recognize that any number of connector(s) of different types, sizes, and/or other connector characteristics will fall within the scope of the present disclosure as well.

In the illustrated embodiment, one or more multi-endpoint adapter device(s) 318 are coupled to the riser device 316 and include a plurality of endpoint subsystems that are coupled to the riser device 316. As such, while the multi-endpoint adapter device(s) 318 are illustrated as a single multi-endpoint adapter device, one of skill in the art in possession of the present disclosure will recognize that a pair of multi-endpoint adapter devices may be coupled to the riser device 316 (e.g., with each multi-endpoint adapter device connected to a respective one of the two ×16 connectors provided on the riser device 316 as discussed above), and may each provide a plurality of endpoint subsystems that are coupled to the riser device 316. In the illustrated example, an endpoint subsystem 320a, an endpoint subsystem 320b, an endpoint subsystem 320c, and an endpoint subsystem 320d are provided by the multi-endpoint adapter device(s) 318 and coupled to the connectors 317 on the riser device 316. In a specific example, the endpoint subsystems provided on the multi-endpoint adapter device(s) 318 may be provided by physical or virtual Peripheral Component Interconnect express (PCIe) endpoints such as, for example, Network Interface Controllers (NICs) and/or any other endpoint subsystem that would be apparent to one of skill in the art in possession of the present disclosure. In some embodiments, more than one endpoint subsystem may be provided by a single NIC such as, for example, when the NIC is configured to provide a "multi-PCIe-endpoint device" that allows for the splitting of the resources of that NIC between multiple processing subsystems. For example, a NIC provided as one of the endpoint subsystems may be configured to split its ×16 connection to the riser device 316 into two ×8 connections to a pair of processing subsystems (i.e., such that the NIC may be considered two endpoint subsystems), or four ×4 connections to each of four processing subsystems (i.e., such that the NIC may be considered four endpoint subsystems).

In various embodiments, traces, cabling, and/or other couplings between the control/bridge subsystem 314, the riser device 316, and the endpoint subsystems 320a-320d may provide a communication coupling 315a between the processing subsystem 306a and the endpoint subsystem 320a, a communication coupling 315b between the processing subsystem 308a and the endpoint subsystem 320b, a communication coupling 315c between the processing subsystem 310a and the endpoint subsystem 320c, and a communication coupling 315d between the processing subsystem 312a and the endpoint subsystem 320d. However, while communication couplings between specific processing subsystems and endpoint subsystems are illustrated, one of skill in the art in possession of the present disclosure will recognize that communication couplings between different processing subsystems and endpoint subsystems will fall within the scope of the present disclosure as well.

In some embodiments, the communication couplings 315a-315d between the endpoint subsystems 320a-320d provided on the multi-endpoint adapter device(s) 318 and the processing subsystems 306a, 308a, 310a, and 312a may be configurable to allocate communication resources in the server device 300 as desired, or may be non-configurable such that communication resources in the server device are static/fixed. Furthermore, each endpoint subsystem 320a-320d may be configured to perform Direct Memory Access (DMA) operations with one or more of the memory subsystem 306b, 308b, 310b, or 312b via the communication couplings 315a-315d. While four endpoint subsystems 320a-320d are illustrated in FIG. 3, one of skill in the art in possession of the present disclosure will recognize that the multi-endpoint adapter device(s) 318 may include at least two endpoint subsystems (e.g., PCIe endpoints, NICs, etc.), and may perform other functionality while remaining within the scope of the present disclosure as well.

In the illustrated embodiment, the multi-endpoint adapter device(s) 318 includes a duplicator device 322 that is coupled to the endpoint subsystems 320a-320d. In different examples, the duplicator device 322 may be provided by an application-specific integrated circuit (ASIC) chip, a field programmable gate array (FPGA), and/or any other programmable duplicator hardware that would be apparent to one of skill in the art in possession of the present disclosure. As such, the duplicator device 322 may include a duplicator processing system (not illustrated, but which may include the processor 102 discussed above with reference to FIG. 1) and a duplicator memory system (not illustrated, but which may include the memory 114 discussed above with reference to FIG. 1) that is coupled to the duplicator processing system and that includes instructions that, when executed by the duplicator processing system, cause the duplicator processing system to provide a duplicator engine that is configured to perform the functionality of the duplicator engines and/or duplicator devices discussed below.

In the illustrated embodiment, the multi-endpoint adapter device(s) 318 includes a port 324 that is coupled to the duplicator device 322. For example, the port 324 may include an RJ45 port, an SFP+ port, a QSFP port, a MINI-SAS HD port, and/or any other port/connector that would be apparent to one skill in the art in possession of the present disclosure. In some embodiments, the port 324 may be coupled to the network 204 discussed above with reference to FIG. 2, may be coupled directly to another device (e.g., another server device 202a-202c, a storage system, a management system, etc.), and/or may be coupled to other systems in a variety of manners that would be apparent to one of skill in the art in possession of the present disclosure. While a single port is illustrated in FIG. 3, one of skill in the art in possession of the present disclosure will recognize that any number of ports may be included on the multi-endpoint adapter device(s) 318 and coupled to the duplicator device 322. The chassis 302 may also house a storage subsystem 326 that is coupled to the host application engine 303 (e.g., via a coupling between the storage subsystem 326, the control/bridge subsystem 314, and the processing subsystems 306a, 308a, 310a, and/or 312a), and may be configured to store the data utilized by the host application engine 304 as discussed below. However, in some embodiments the storage subsystem 306 may be omitted, may be accessible over the network 204, or coupled directly to an endpoint adapter device such as the multi-endpoint adapter device(s) 318. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
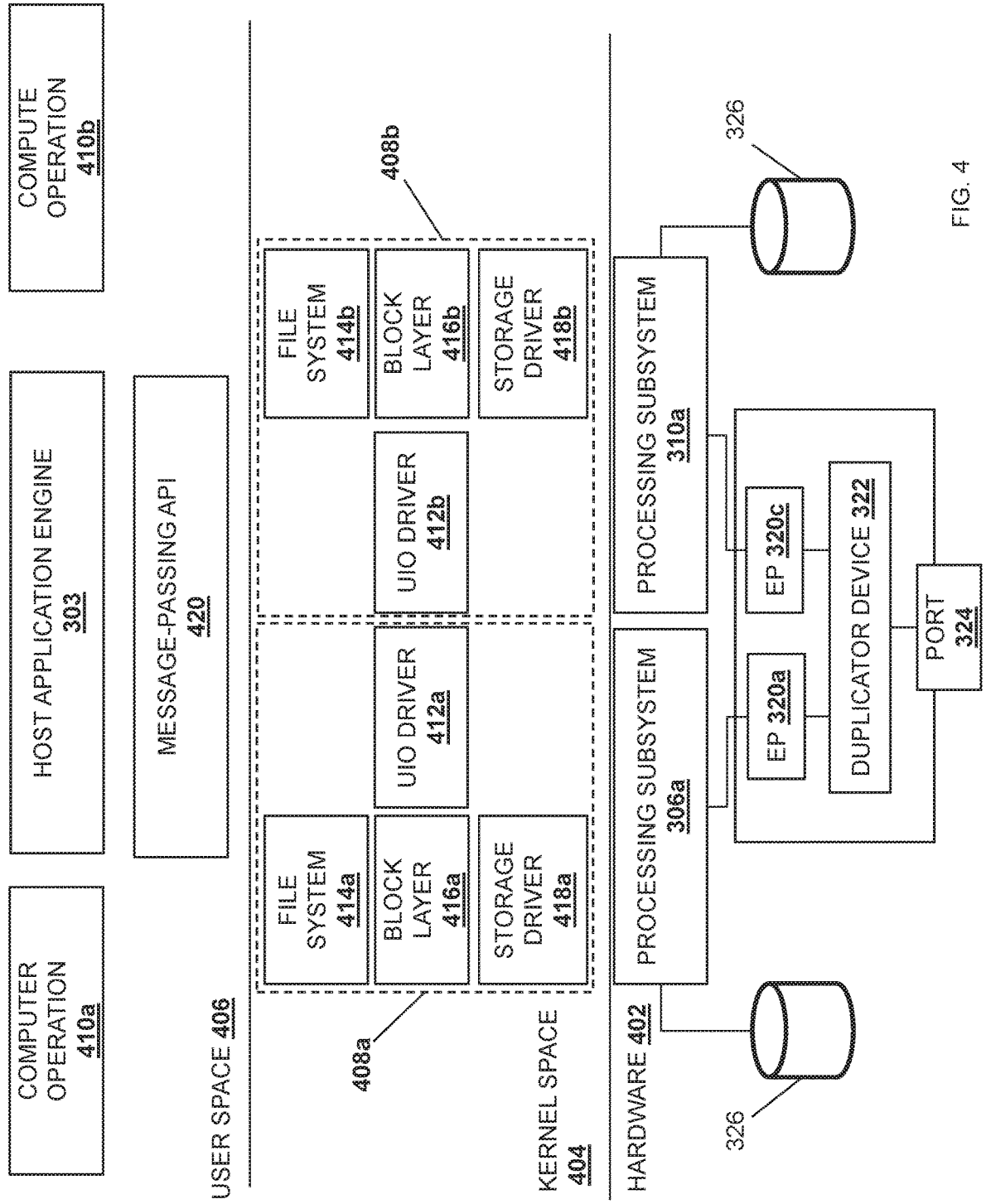
FIG. 4 is a schematic view illustrating an embodiment of a stack implementation that may be provided in the server device of FIG. 3 and that may provide the multi-processor/endpoint data duplicating system of the present disclosure.

Referring now to FIG. 4, an embodiment of a stack implementation 400 provided in the server device 300 discussed above with reference to FIG. 3 is illustrated. As illustrated, the stack implementation 400 may include a hardware level 402, a kernel space 404, and a user space 406. One of skill in the art in possession of the present disclosure will recognize that the hardware level 402 provided in FIG. 4 only illustrates a portion of the components provided in the server device 300 for clarity, and that other components in the server device 300 discussed above with reference to FIG. 3 may be provided in the hardware level 402 as well.

In an embodiment, each processing subsystem 306a, 308a, 310a, and/or 312a may include a respective socket domain for parallel processing. As such, the kernel space 404 may include a kernel stack for each computer operation/thread that is provided in the user space 406 and that executes on a respective processing subsystem. For example, a kernel stack 408a may be provided for a computer operation 410a for the host application engine 303 executing on the processing subsystem 306a, and a kernel stack 408b may be provided for a computer operation 410b for the host application engine 303 executing on the processing subsystem 310a. The kernel stack 408a may include a Userspace Input/Output (UIO) driver 412a, a file system driver 414a, a block layer driver 416a, a storage driver 418a, and/or any other driver and/or module that would be apparent to one of skill in the art in possession of the present disclosure. Similarly, the kernel stack 408b may include a UIO driver 412b, a file system driver 414b, a block layer driver 416b, a storage driver 418b, and/or any other driver and/or module that would be apparent to one of skill in the art in possession of the present disclosure. The kernel space 404 may assist in providing communication between the user space 406 and the hardware level 402, as discussed further below. While a specific kernel space 404 has been illustrated and described, one of skill in the art in possession of the present disclosure will recognize that the kernel space of the present disclosure may include a variety of components/drivers and component configurations while remaining within the scope of the present disclosure as well.

The user space 406 may include the host application engine 303 that provides computer operations 410a and 410b via the respective processing subsystems 306a and 310a. A message-passing application programming interface (MPI) 420 may be included in the user space 406 to interface the host application engine 303 with the kernel space 404. For example, the MPI 420 may include OpenMPI and/or any other application programming interface (API) that can facilitate parallel processing on more than one processing subsystem. One of skill in the art in possession of the present disclosure will recognize that other modules may be included in the user space 406 such as, for example, other APIs, firmware, drivers, and/or other modules that would be apparent to one of skill in the art in possession of the present disclosure. For example, each processing subsystem socket domain may include a NIC drivers and data plane libraries (e.g., a Data Plane Development Kit (DPDK)) that provides the endpoint subsystems 320a and 320c direct access to the user space 406. For example, the DPDK (not illustrated) for each socket domain may use its respective UIO driver 412a and/or 412b to map device I/O memory and interrupts into the user space 406 and, once mapped into user space 406, the host application engine 303 may transfer data payloads to and from the endpoint subsystems 320a and/or 320c in bursts using various poll-mode operations. While a specific stack implementation 400 provided in the server device 300 has been illustrated, one of skill in the art in possession of the present disclosure will recognize that the stack implementation 400 may include other mechanisms for providing data between the hardware and the user space, and/or other architectures for parallel computing in order to provide the functionality discussed below, while remaining within the scope of the present disclosure as well.

Figure 5:
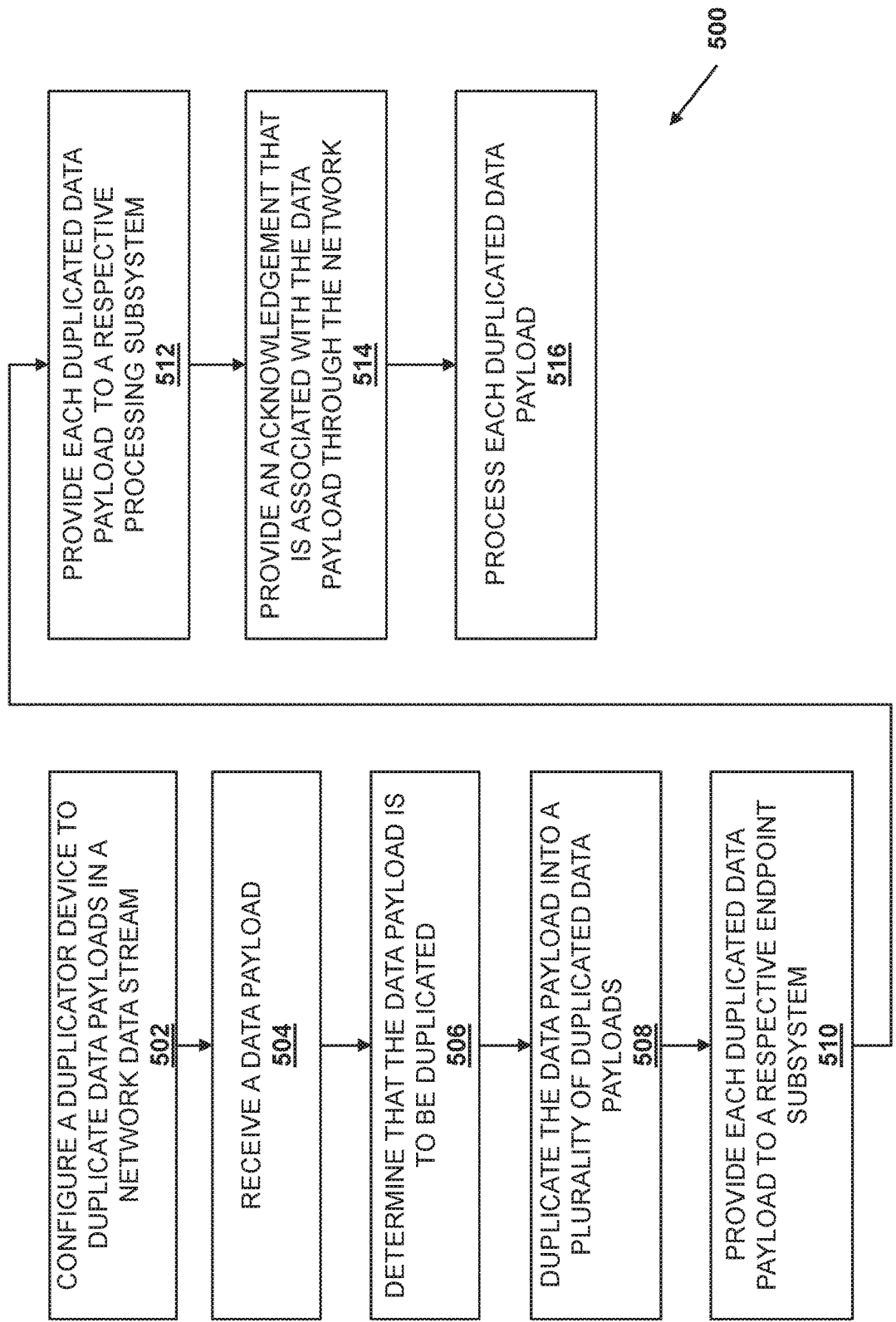
FIG. 5 is a flow chart illustrating an embodiment of a method of duplicating a network data stream.

Referring now to FIG. 5, an embodiment of a method 500 for duplicating network data streams is illustrated. As discussed below, the systems and methods of the present disclosure provide a duplicator device that duplicates data received at a multi-endpoint adapter device. For example, the duplicator device may be configured to duplicate an incoming network data stream into a duplicated network data streams, and provide the duplicated network data streams to respective processing subsystems coupled to the multi-endpoint adapter device via respective endpoint subsystems that are provided by the multi-endpoint adapter device coupled to those respective processing subsystems. Prior to duplicating the network data stream, a host application may notify the duplicator device as to which processing subsystems are expected to process the network data stream in parallel, and these configuration notifications may be used by the duplication device to perform the duplication of the incoming network data stream, as well as to provide the duplicated network data streams to the appropriate processing system through respective endpoint subsystems. As such, a more efficient server device for processing network data streams is provided that operates to duplicate network data streams and provide those duplicated network data streams directly to their respective processing subsystems, and without the need to copy the network data stream to each processing subsystem (as is required in conventional server devices that utilize multiple processors in the processing of network data streams.) The elimination of the need to copy the network data stream to each of the processing subsystems (e.g., via UPIs connecting those processing subsystems), or the need to obtain the network data stream by each processing subsystem via the network, provide decreases in latency, bandwidth costs, and other inefficiencies experienced conventional server devices.

The method 500 begins at block 502 where a duplicator device is configured to duplicate data payloads in a network data stream. In an embodiment, at block 502, the duplicator device 322 is configured to duplicate data payloads in a network data stream received over the network 204. In the specific examples provided below, the data payloads may be provided as part of a video data stream, although one of skill in the art in possession of the present disclosure will recognize that the data payloads duplicated according to the teachings of the present disclosure may be provided by any network data stream known in the art.

In some embodiments, at block 502 the host application engine 303 may configure the duplicator device 322 to duplicate data payloads before the data payloads are received by the duplicator device 322. For example, the host application engine 303 may be an application endpoint that is communicating with another application endpoint over the network 204. In a specific example, the host application engine 303 provided by the server device 202a may be communicating with an application on the server device 202b using a Remote Direct Memory Access (RDMA) protocol that includes the use of RDMA protocol verbs to perform pull mode data transfers to obtain data payloads from the application provided by the server device 202b. In another specific example, the host application engine 303 provided by the server device 202a may be communicating with the application on the server device 202b using a TCP/IP protocol.

As such, the host application engine 303 may identify a data payload in the network data stream that should be processed by separate processing subsystems in parallel. For example, a data payload may be identified by the host application engine 303 for processing by the processing subsystem 306a and the processing subsystem 310a. As a result, the host application engine 303 may provide a first configuration notification to the endpoint subsystem 320a via the communication coupling 315a, and the endpoint subsystem 320a may provide the first configuration notification to the duplicator device 322. The duplicator device 322 may then configure its hardware and/or the duplicator engine to recognize the data payload when the data payload is received by the duplicator device 322.

Similarly, the host application engine 303 may identify the data payload to be processed by the processing subsystem 310a, and the host application engine 303 may provide a second configuration notification to the endpoint subsystem 320c via the communication coupling 315c. As such, the endpoint subsystem 320c may provide the second configuration notification to the duplicator device 322, and the duplicator device 322 may configure its hardware and/or the duplicator engine to recognize the data payload when the data payload is received by the duplicator device 322. Thus, the duplicator device 322 may use the first configuration notification and the second configuration notification to identify data payload(s) for duplication. While two configuration notifications for duplicating a data payload for two processing subsystems are discussed in the examples below, one of skill in the art will recognize that data payload(s) may be duplicated for any of the plurality of processing subsystems 306a, 308a, 310a, and/or 312a while remaining within the scope of the present disclosure as well.

The method 500 then proceeds to block 504 where a data payload in the network data stream is received. In an embodiment, at block 504, the duplicator device 322 may receive the data payload via the port 324. In some examples, prior to the duplicator device 322 receiving the data payload via the port 324, the host application engine 303 provided on the server device 202a/300 may request the data payload from the server device 202b via the network 204, and the request may cause the server device 202b to provide the data payload to the server device 202a/300 via the network 204. In a specific example, the host application engine 303 provided on the server device 202a/300 may perform an RDMA transfer operation that pulls the data payload from the server device 202b. As such, the host application engine 303 provided on the server device 202a/300 may issue a read request for the data payload that includes a destination memory address in its local memory, and the server device 202b may respond by writing the desired data directly into the requested location in the local memory provided for the host application engine 303 provided on the server device 202a/300 using the multi-endpoint adapter device(s) 318. As such, the server device 202b may provide the data payload to the multi-endpoint adapter device(s) 318 to perform a DMA write to system memory (e.g., the memory subsystem 306b, the memory subsystem 308b, the memory subsystem 310b, and/or the memory subsystem 312b) provided on the server device 202a/300. As illustrated in the specific example provided in the sequence diagram 600 of FIG. 6 and the server device 300 in FIG. 7A, a data payload 702 may be received by the duplicator device 322 via the port 324 in steps 602 and 604.

The method 500 then proceeds to block 506 where the data payload is identified for duplication. In an embodiment, at block 406, the duplicator device 322 may identify the data payload for duplication. In some embodiments, the duplicator device 322 and/or the duplicator engine may be configured with packet inspection logic to analyze data payloads and identify that a data payload is destined to more than one of the processing subsystems 306a, 308a, 310a, and/or 312a, For example, the duplicator device 322 may use the configuration performed at block 502 of method 500 to inspect and identify a data payload for duplication. In the specific examples of FIGS. 6, 7A-7F, and 8A-8D, the duplicator device 322 may identify that the data payload 702 is identified by a configuration for duplication to each of the processing subsystem 306a and the processing subsystem 310a.

Figure 7A:
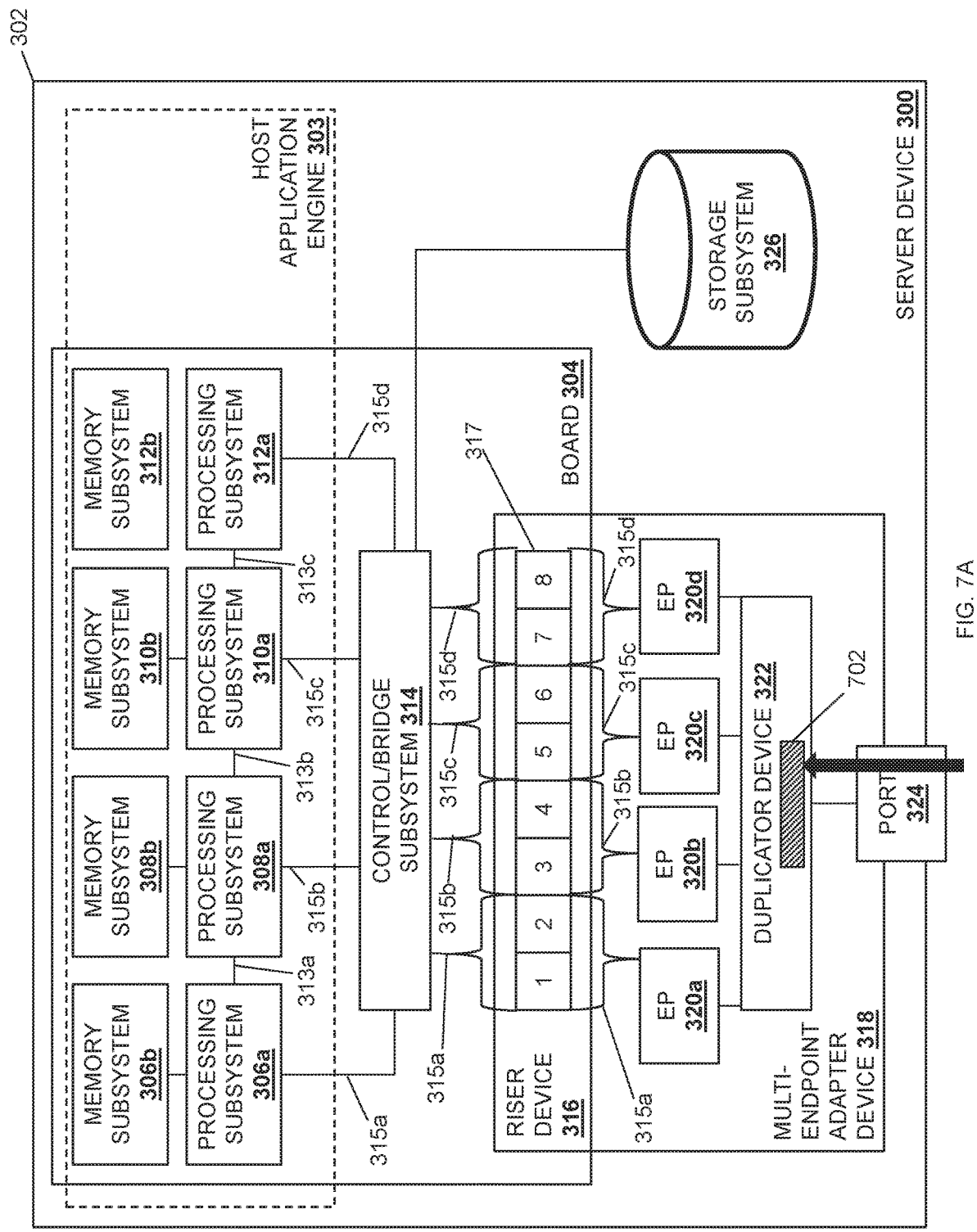
FIG. 7A is a schematic view illustrating an embodiment of the duplication of a network data stream in the multi-processor/endpoint data duplicating system provided by the server device of FIG. 3 and during the method of FIG. 5.
Figure 7B:
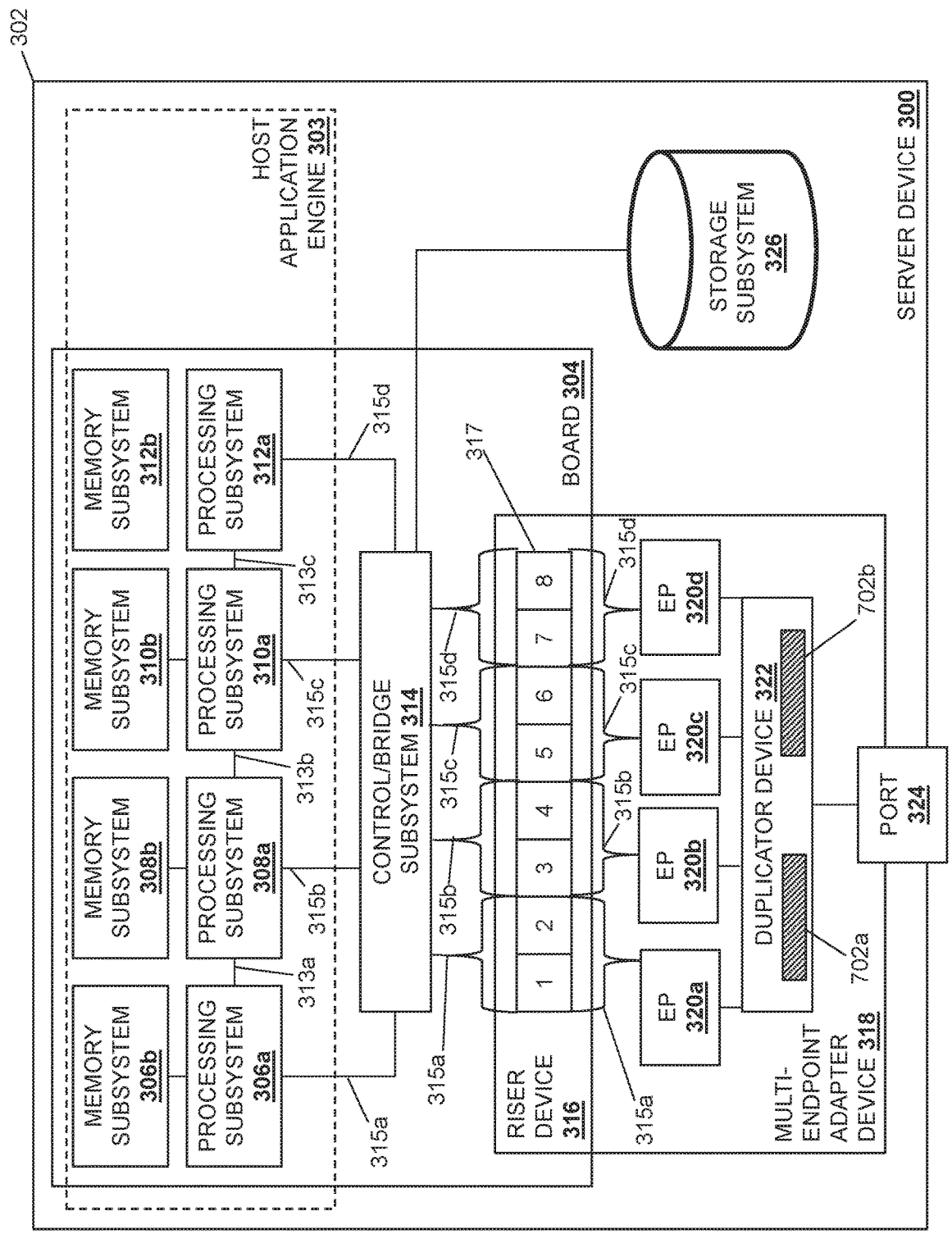
FIG. 7B is a schematic view illustrating an embodiment of the duplication of a network data stream in the multi-processor/endpoint data duplicating system provided by the server device of FIG. 3 and during the method of FIG. 5.

The method 500 then proceeds to block 508 where the data payload is duplicated to satisfy the number of processing subsystems that are to receive a copy of the payload data. In an embodiment, at block 508, the duplicator device 322 may duplicate the data payload into a plurality of duplicated data payloads, one for each processing subsystem that is to process the data payload in parallel. For example, the duplicator device 322 and/or the duplicator engine may include duplication logic that duplicates/reproduces the data payload into duplicated data payloads. In some embodiments, the duplicated data payloads may include the original data payload and a copy of the original data payload, or just copies of the original data payload, and the number of duplicated data payloads may be based on the number of processing subsystems 306a, 308a, 310a, and/or 312a that are to process the data payload in parallel. As illustrated in FIG. 7B, the duplicator device 322 has duplicated the data payload 702 to provide the duplicated data payload 702a and the duplicated data payload 702b for processing on the processing subsystem 306a and the processing subsystem 310a, respectively.

The method 500 then proceeds to block 510 where each duplicated data payload is provided to a respective endpoint subsystem. In an embodiment, at block 510, the duplicator device 322 may forward each duplicated data payload that was duplicated from the received data payload at block 508 to respective endpoint subsystems 320a, 320b, 320c, and/or 320d. In some embodiments, the duplicator device 322 and/or the duplicator engine may be configured with forwarding logic to forward each duplicated data payload to its respective endpoint subsystem 320a, 320b, 320c, and/or 320d. For example, the forwarding logic may forward each duplicated data payload to its respective endpoint subsystem using the configuration notifications received during block 502 of method 500 (e.g., the first configuration notification and the second configuration notification discussed above). In a specific example, the configuration notification may have caused the duplicator device 322 to map the memory addresses provided in the configuration notifications to the endpoint subsystems that are associated with those memory addresses and that provided the configuration notifications to the duplicator device 322.

Figure 6:
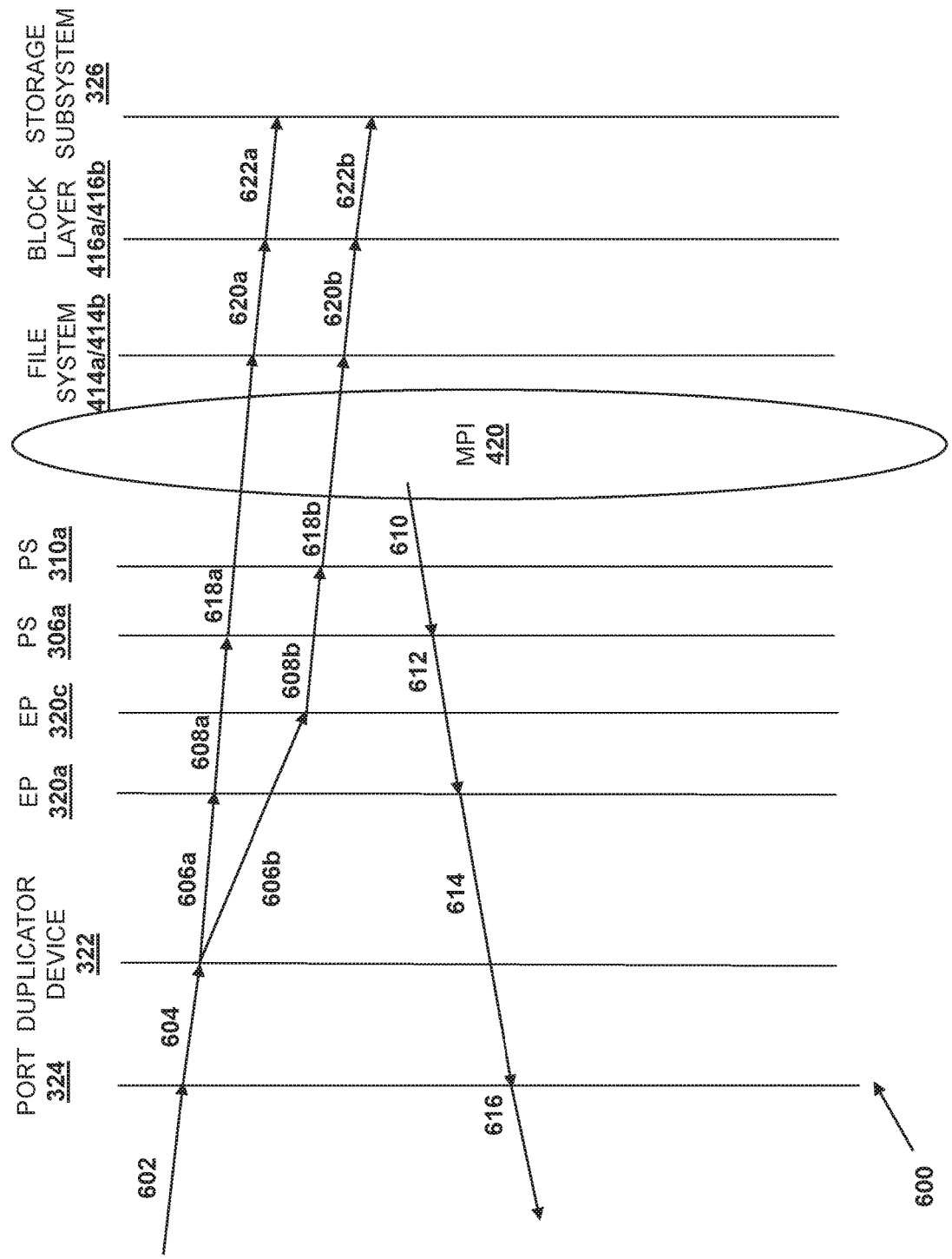
FIG. 6 is a sequence diagram illustrating an embodiment of the duplication of a network data stream in the multi-processor/endpoint data duplicating system provided by the server device of FIGS. 3 and 4 and during the method of FIG. 5.
Figure 7C:
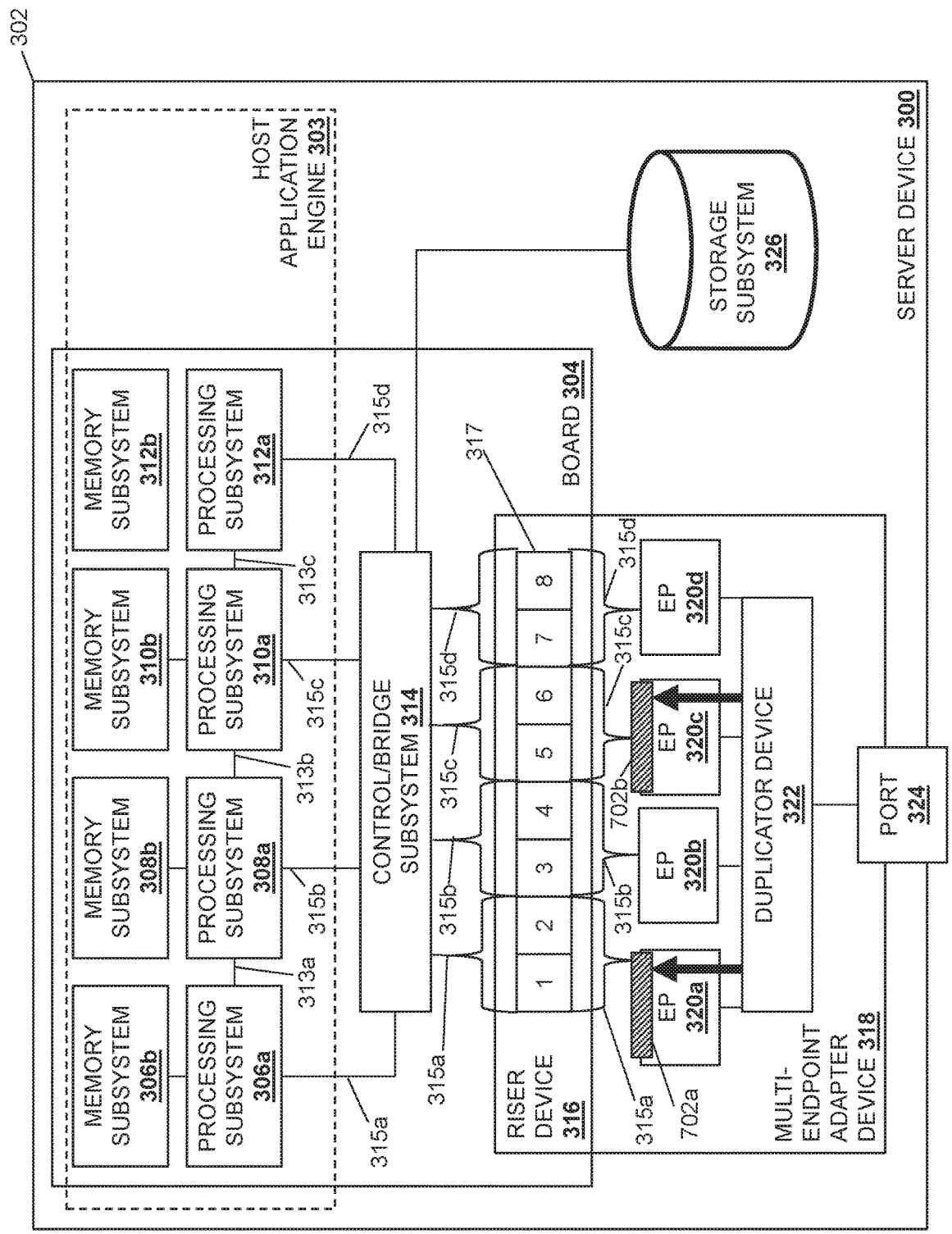
FIG. 7C is a schematic view illustrating an embodiment of the duplication of a network data stream in the multi-processor/endpoint data duplicating system provided by the server device of FIG. 3 and during the method of FIG. 5.
Figure 7D:
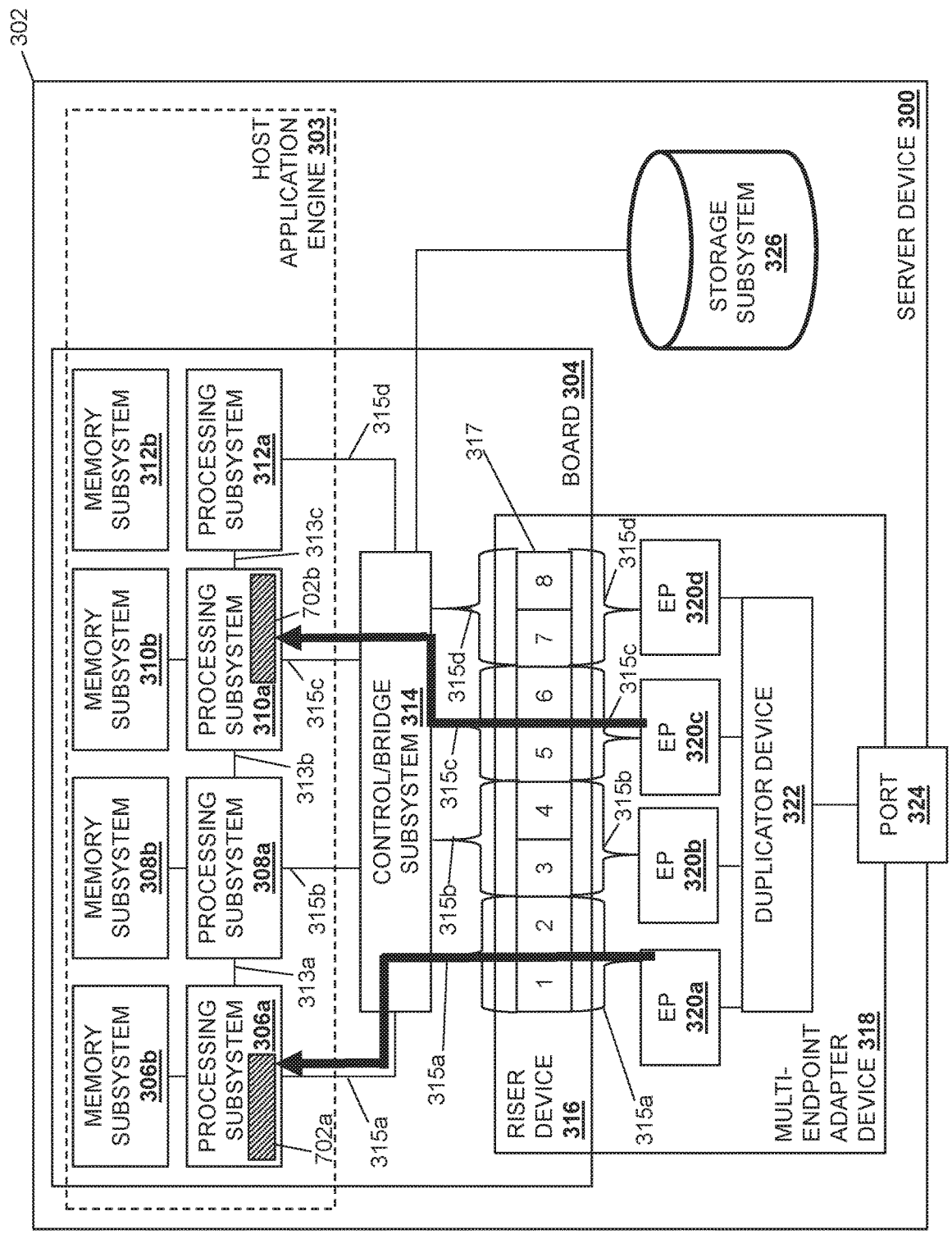
FIG. 7D is a schematic view illustrating an embodiment of the duplication of a network data stream in the multi-processor/endpoint data duplicating system provided by the server device of FIG. 3 and during the method of FIG. 5.

As such, the first configuration notification received at block 502 may have indicated that its identified data payload is to be provided to the processing subsystem 306a, and was provided by the endpoint subsystem 320a. Thus, as illustrated in FIG. 6 at step 606a, a duplicated data payload may be provided to the endpoint subsystem 320a and, as illustrated in FIG. 7C, the duplicated data payload 702a may be forwarded to the endpoint subsystem 320a. Similarly, the second configuration notification received at block 502 may have indicated that the data payload is to be provided to the processing subsystem 310a, and was provided by the endpoint subsystem 320c. Thus, as illustrated in FIG. 6 at step 606b, the duplicated data payload is provided to the endpoint subsystem 320c and, as illustrated in FIG. 7C, the duplicated data payload 702b may be forwarded to the endpoint subsystem 320c.

The method 500 may then proceed to block 512 where each duplicated data payload is provided to a respective processing subsystem that is included in the plurality of processing subsystems. In an embodiment, at block 512, the endpoint subsystems 320a, 320b, 320c, and/or 320d that received the duplicated data payloads may provide those duplicated data payloads to their corresponding processing subsystem 306a, 308a, 310a, and/or 312a. As illustrated at step 608a in FIG. 6 as well as in FIG. 7D, the endpoint subsystem 320a may provide the duplicated data payload 702a to the processing subsystem 306a via the communication coupling 315a. Similarly, as illustrated at step 608b in FIG. 6, as well as in FIG. 7D, the endpoint subsystem 320c may provide the duplicated payload portion 702b to the processing subsystem 310a via the communication coupling 315c. Continuing with the specific example above in which the host application engine 303 utilizes the RDMA protocol, the endpoint subsystem 320a may include a DMA engine that performs a DMA write operation directly into a memory address provided in the memory subsystem 306b (which is the local memory for the processing subsystem 306a.) Similarly, the endpoint subsystem 320c may include a DMA engine that performs a DMA write operation directly into the memory address provided in the memory subsystem 310b (which is the local memory for the processing subsystem 310a.)

The method 500 may then proceed to block 514 where an acknowledgement that is associated with the data payload is provided via the network port and through the network. In an embodiment, at block 514, a single acknowledgement that acknowledges the receipt of the data payload is provided via the network port 324 and through the network 204 to the server device that provided the data payload. For example, and as illustrated at steps 610-616 in FIG. 6, as well as in FIG. 7E, the MPI 420 may provide an acknowledgement 704 (via the processing subsystem 306a) to the endpoint subsystem 320a at steps 610 and 612, and at steps 614 and 616 the endpoint subsystem 320a may provide the acknowledgement 704 through the port 324 and via the network 204 to the server device 202b (which sent the data payload 702 in this example). As such, the server device 300 maintains a one-to-one relationship with the sender server device 202b, with only one of the multiple processing subsystems 306a, 308a, 310a, or 312a that may be processing a duplicated data payload sends an acknowledgement back to the server device 202b in response to receiving the duplicated data payload.

Figure 8A:
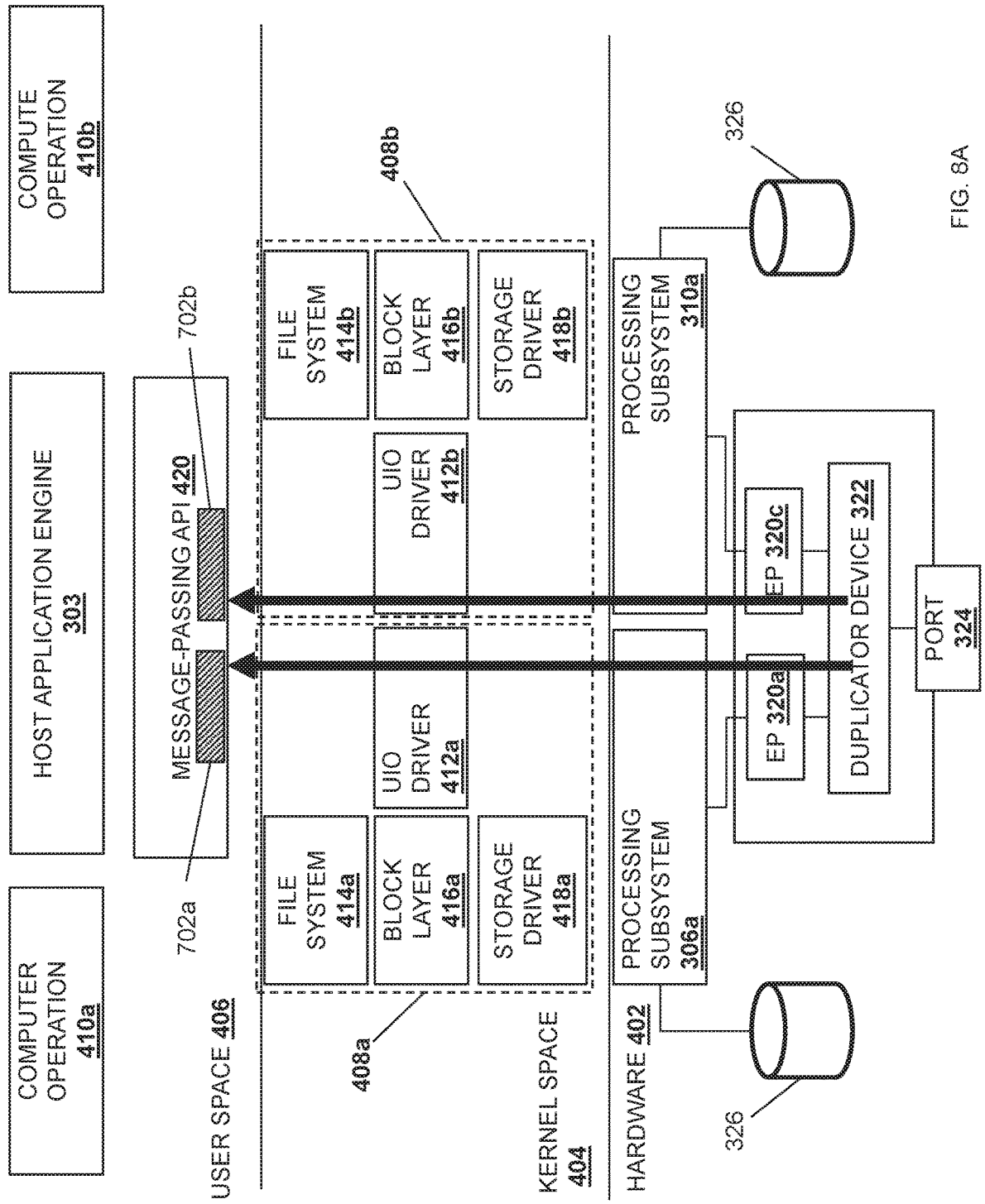
FIG. 8A is a schematic view illustrating an embodiment of the duplication of a network data stream in the multi-processor/endpoint data duplicating system provided by the stack implementation in the server device of FIG. 4 and during the method of FIG. 5.

Referring now to FIG. 8A, a specific example of the processing subsystem 306a providing the acknowledgement 704 is illustrated. In an embodiment, once the duplicated data payload 702a is provided to the processing subsystem 306a at the hardware level 402 provided in the stack implementation 400, the processing subsystem 306a may provide the duplicated data payload 702a via its root port to the UIO driver 412a provided in the kernel space 404. The UIO driver 412a may then provide the duplicated data payload 702a to the message-passing API (MPI) 420 provided in the user space 406. For example, the UIO driver 412a may provide the duplicated data payload 702a to the MPI 420 via a set of data plane libraries and/or NIC drivers provided in the user space 406 (e.g., the Data Plane Development Kit and/or other development kits that allow direct user space access to network interface controllers.)

Similarly, once the second duplicated data payload 602b is provided to the processing subsystem 310a at the hardware level 402 provided in the stack implementation 400, the processing subsystem 310a may provide the duplicated data payload 702b via its root port to the UIO driver 412b provided in the kernel space 404. The UIO driver 412b may then provide the duplicated data payload 702b to the MPI 420 provided in the user space 406. For example, the UIO driver 412a may provide the duplicated data payload 702b to the MPI 420 via a set of data plane libraries and/or network interface controller drivers in the user space 406 (e.g., the Data Plane Development Kit and/or other development kits that allow direct user space access to network interface controllers.)

Figure 8B:
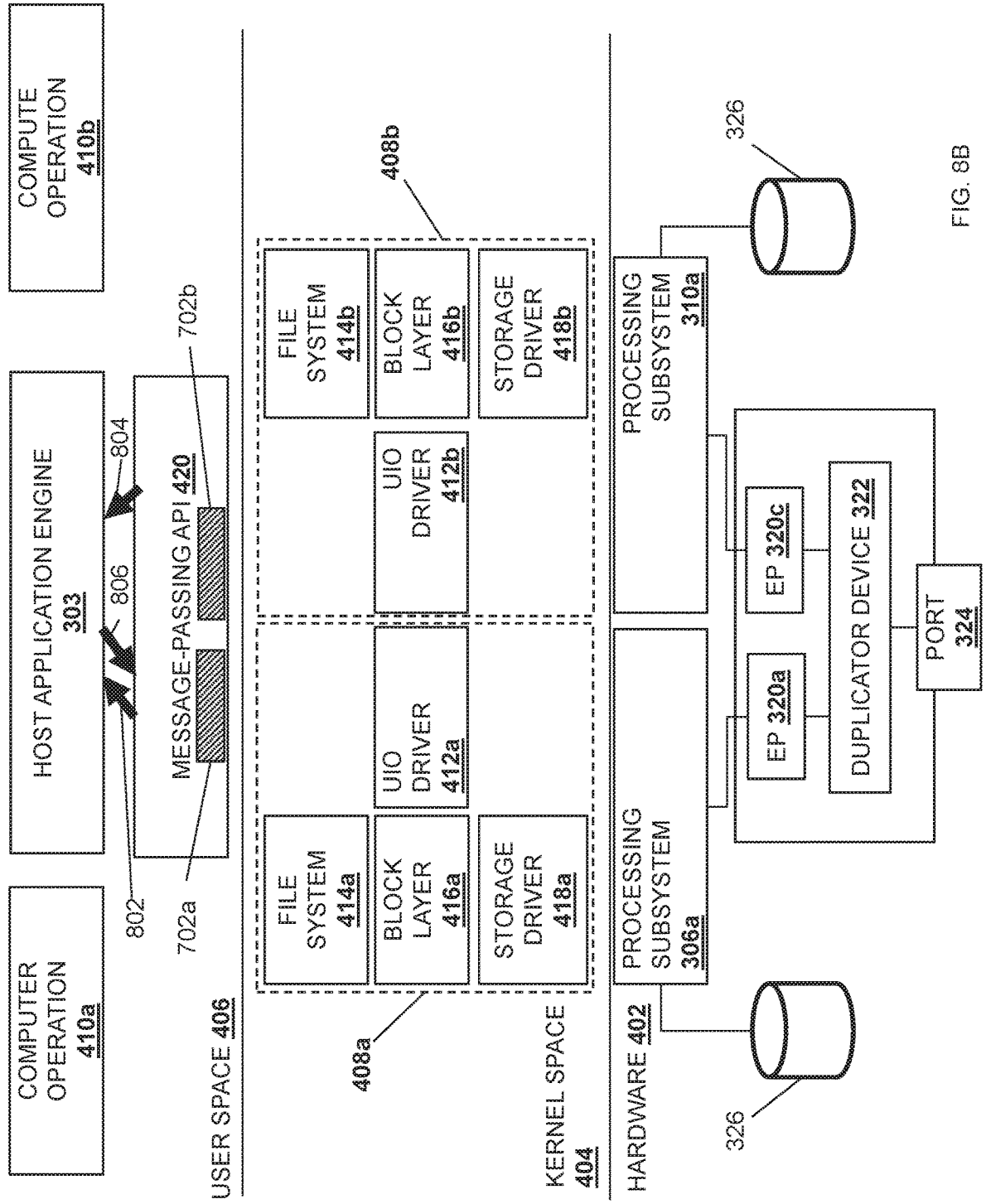
FIG. 8B is a schematic view illustrating an embodiment of the duplication of a network data stream in the multi-processor/endpoint data duplicating system provided by the stack implementation in the server device of FIG. 4 and during the method of FIG. 5.

Referring now to FIG. 8B, the MPI 420 may communicate with the host application engine 303 to indicate that the duplicated data payload 702a has been received by the MPI 420, as represented by arrow 802 in FIG. 8B. For example, the MPI 420 may provide a first mpi_recv( ) message to the host application engine 303. Similarly, the MPI 420 may communicate with the host application engine 303 to indicate that the duplicated data payload 702b has been received by the MPI 420, as represented by arrow 804 in FIG. 8B. For example, the MPI 420 may provide a second mpi_recv( ) message to the host application engine 303. In an embodiment, the host application engine 303 may be configured to provide a command that causes the MPI 420 to provide an acknowledgement (e.g., mpi_sentack( ) to the sender (e.g., the server device 202b) of the data payload 702. The configuration of the duplicator device 322 by the host application engine 303 to duplicate the data payload 702 may allow the host application engine 303 to recognize that the first mpi_rec( ) message and the second mpi_rec( ) message are from duplicated data payloads. As such, the MPI 420 may provide a single command for acknowledgement of receipt of the data payload 702, as represented by arrow 806 in FIG. 8B.

Figure 7E:
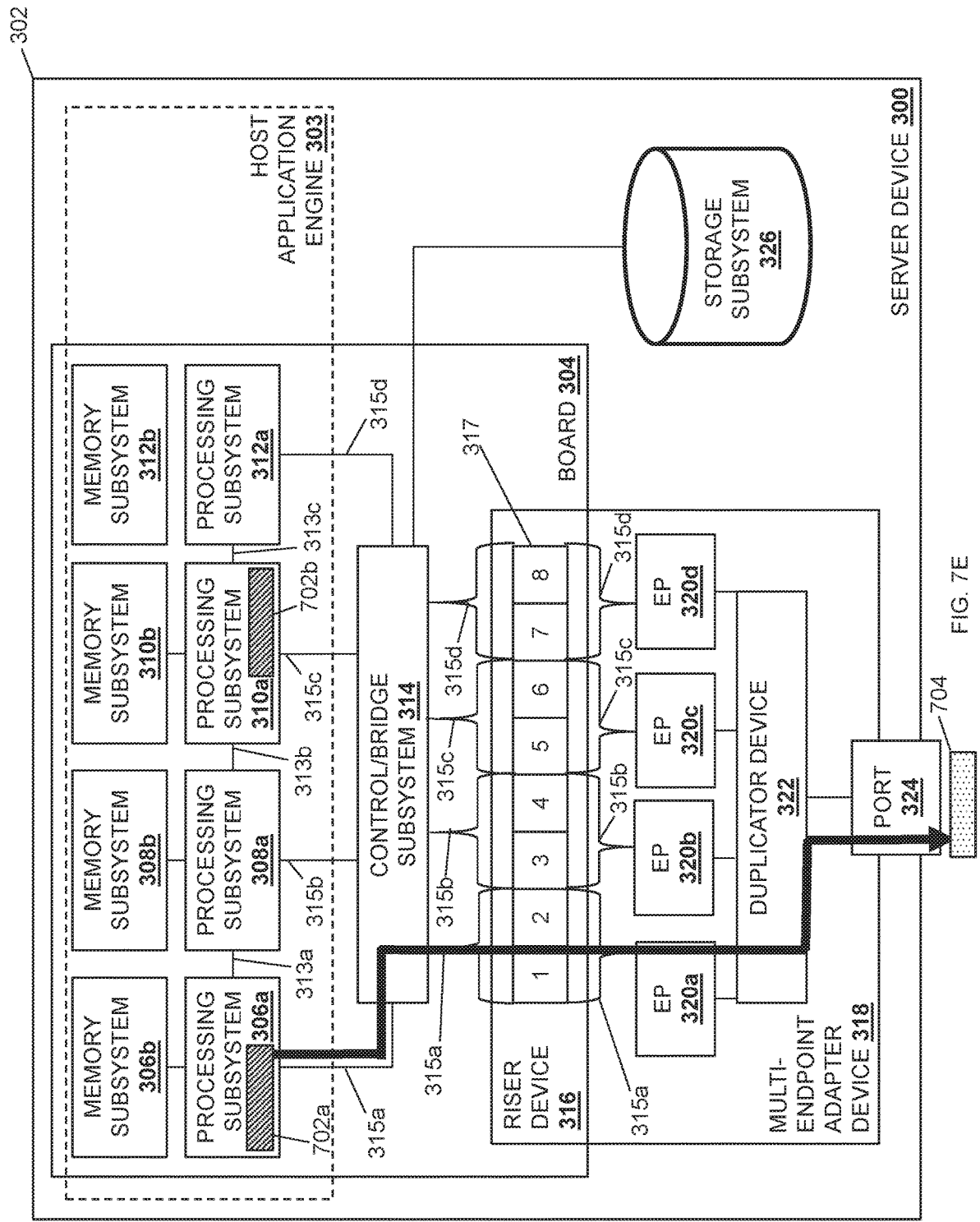
FIG. 7E is a schematic view illustrating an embodiment of the duplication of a network data stream in the multi-processor/endpoint data duplicating system provided by the server device of FIG. 3 and during the method of FIG. 5.
Figure 8C:
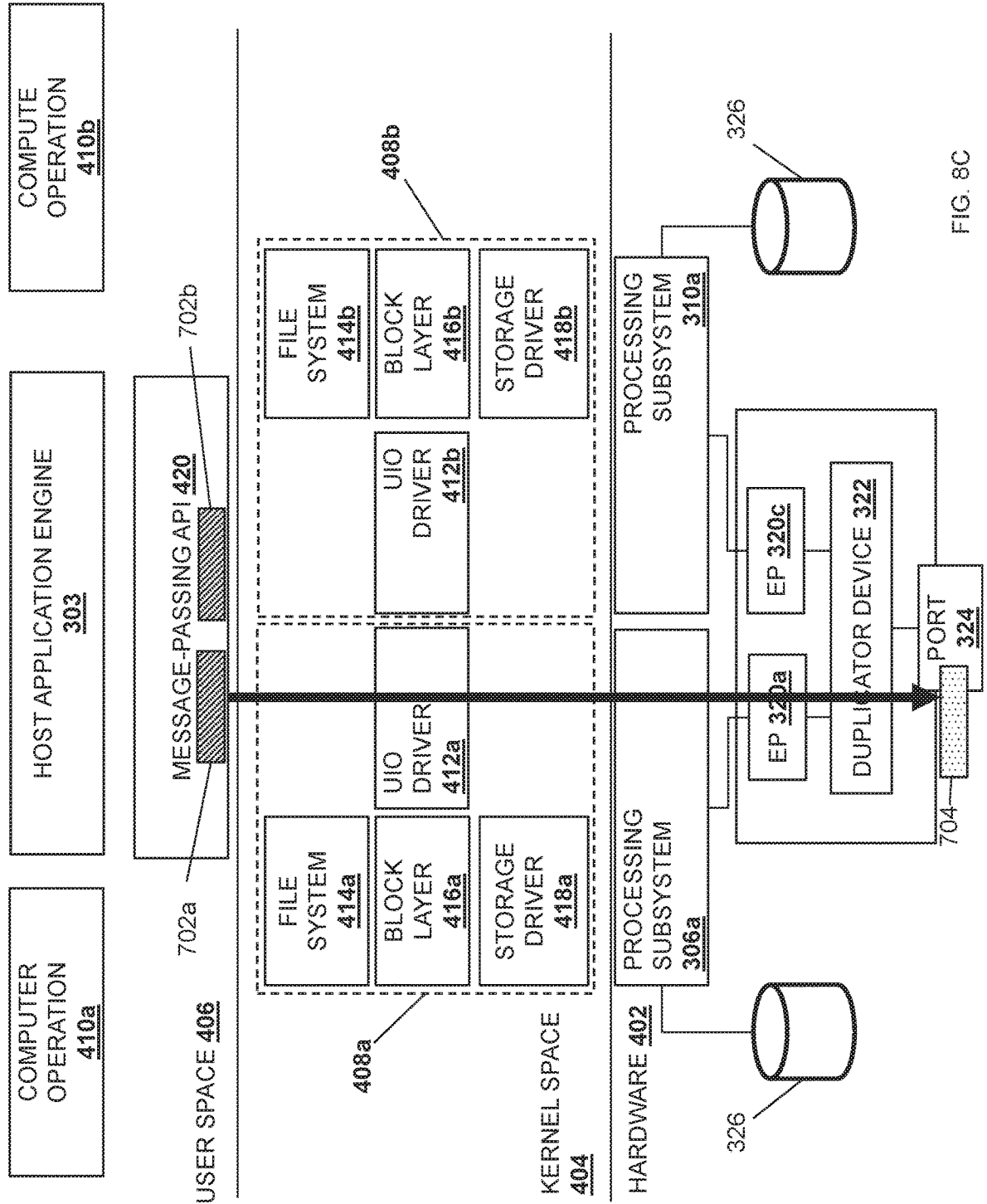
FIG. 8C is a schematic view illustrating an embodiment of the duplication of a network data stream in the multi-processor/endpoint data duplicating system provided by the stack implementation in the server device of FIG. 4 and during the method of FIG. 5.

Referring now to FIG. 8C, the MPI 420 may provide the acknowledgement 704 back through the data plane libraries and/or network interface controller drivers in the user space 406, and the acknowledgement 704 may then be provided to the UIO driver 412a provided in the kernel space 404, which provides the acknowledgement 704 to the root port of the processing subsystem 306a. The processing subsystem 306a may then provide the acknowledgement 704 through the endpoint subsystem 320a and through the network 204 via the network port 324, which is illustrated in FIG. 7E as well.

As such, the one-to-one response ratio between sender and receiver is maintained by the MPI 420.

The method 500 may then proceed to block 516 where each duplicated data payload is processed by its respective processing subsystem. In an embodiment of block 516, each processing subsystem 306a. 308a, 310a and/or 312b may then process the duplicated data payload that it received according to, for example, the instructions/tasks each processing subsystem 306a, 308a, 310a, and/or 312a was assigned by the host application engine 303. Continuing with the illustrated example, the processing subsystem 306a may process the duplicated data payload 702a, while the processing subsystem 310a may process the duplicated data payload 702b. One of skill in the art in possession of the present disclosure will recognize that the method 500 may then be repeated for any data payload received as part of the network data stream, thus providing for data duplicating in a multi-processor/endpoint system to provide duplicated data payloads received in a data stream to different endpoint/processor/memory subsystems.

Figure 8D:
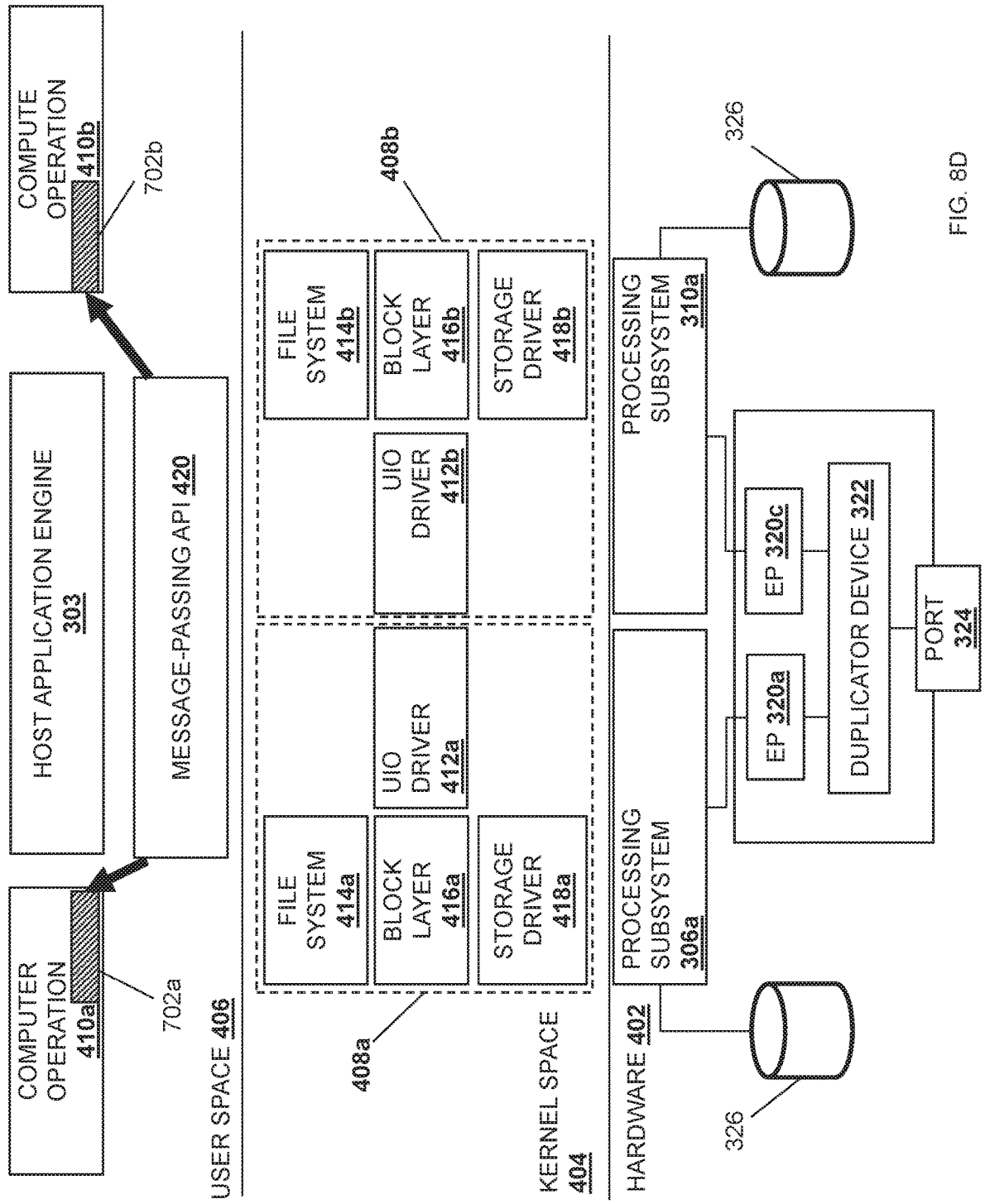
FIG. 8D is a schematic view illustrating an embodiment of the duplication of a network data stream in the multi-processor/endpoint data duplicating system provided by the stack implementation in the server device of FIG. 4 and during the method of FIG. 5.

In an embodiment of block 516 and with reference to FIG. 8D, once the acknowledgement 704 is sent, the MPI 420 may provide the duplicated data payload 702a to the computer operation 410a provided by the host application engine 303 for processing. For example, the computer operation 410a may process the duplicated data payload 702a according to a first set of instructions. Likewise, the MPI 420 may provide the duplicated data payload 602a to the computer operation 410b provided by the host application engine 303 for processing, and the computer operation 410b may process the duplicated data payload 702b according to a second set of instructions. As such, the computer operation 410a may process the duplicated data payload 702a in parallel (e.g., simultaneously) with the processing of the duplicated data payload 702b by the computer operation 410b.

Figure 7F:
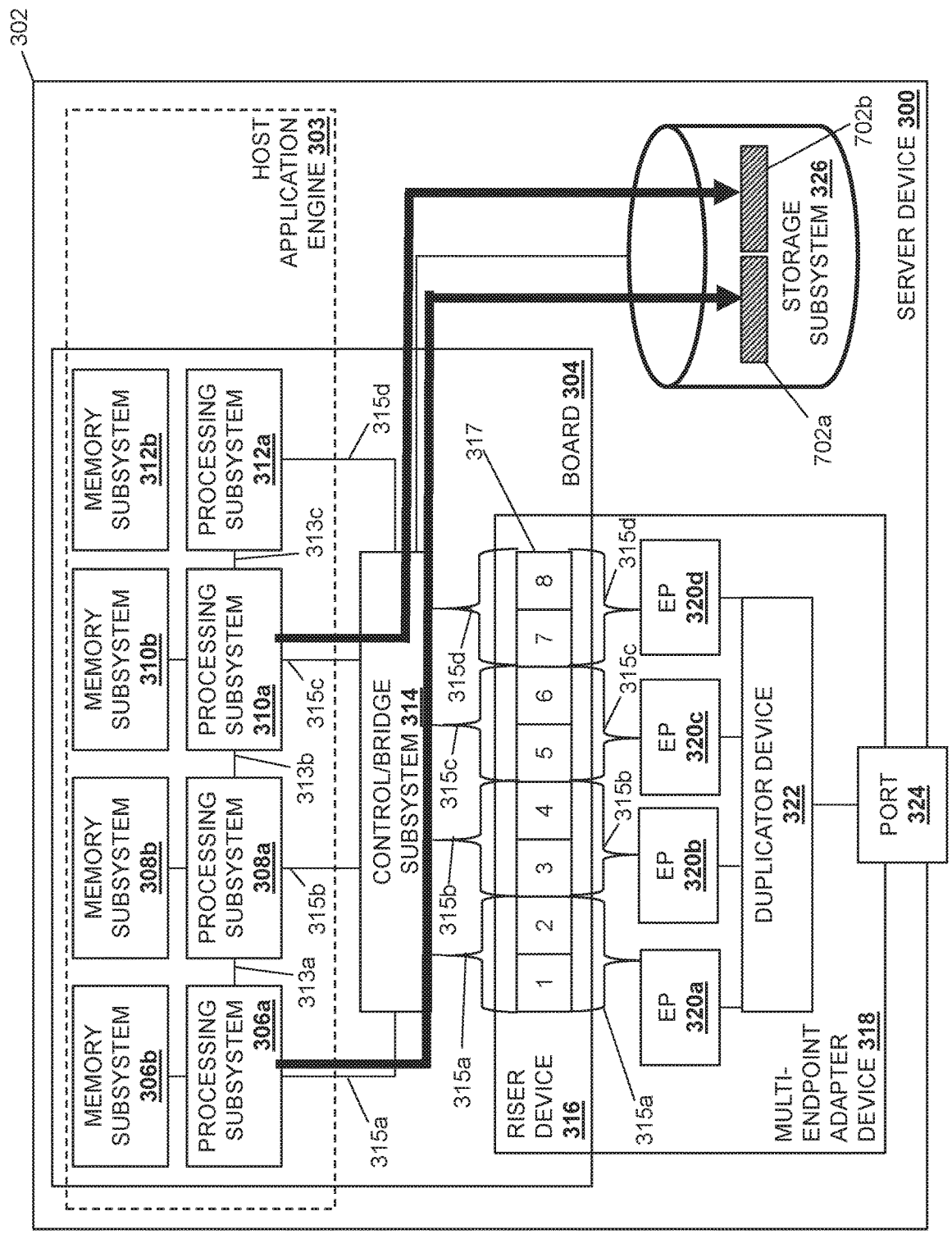
FIG. 7F is a schematic view illustrating an embodiment of the duplication of a network data stream in the multi-processor/endpoint data duplicating system provided by the server device of FIG. 3 and during the method of FIG. 5.

Referring now to FIGS. 6, 7F and 8E, the computer operation 410a may provide the duplicated data payload 602a to the storage subsystem 326 via the file system driver 414a, the block layer driver 416a, and the storage driver 418a provided in the kernel space 404, as well as the processing subsystem 306a in steps 618a, 620a, and 622a. The processing subsystem 306a may then provide the duplicated data payload 702a to the storage subsystem 326 via the communication coupling 315a and the control/bridge subsystem 314. Similarly, the computer operation 410b may provide the duplicated data payload 702b to the storage subsystem 326 via the file system driver 414b, the block layer driver 416b, and the storage driver 418b provided in the kernel space 404, as well as the processing subsystem 310a in steps 618b and 620b. The processing subsystem 306c may then provide the duplicated data payload 602b to the storage subsystem 326 via the communication coupling 315c and the control/bridge subsystem 314.

Thus, systems and methods have been described that provide for the duplication of data payloads included in a network data stream between processor/endpoint subsystems via the configuration of a duplicator device included on a multi-endpoint adapter device to duplicate data payloads into duplicated data payloads, and provide each duplicated data payload to a respective endpoint subsystem associated with a respective processing subsystem that is designated to process that the data payload in parallel with another processing subsystem. Each processing subsystem may then receive its duplicated data payload and processes it in parallel according to each task assigned to it. A single acknowledgement may then be returned to the server device that sent the data payload from one of those processing subsystems in order to maintain IO coherence attributes such as a one-to-one responder-sender relationship. As such, UPIs between multiple processing subsystems are not used to copy the data payloads from the local memory of one processing subsystem to the local memory of another processing subsystem, preventing performance degradations. By eliminating the need to copy each complete data payload to each of the processing subsystems through UPIs, decreases in latency, bandwidth costs, and other inefficient functionality are realized. Furthermore, the systems and methods of the present disclosure may provide an efficient method to duplicate large file processing simultaneously by processing subsystem in a single root domain server, which differs from Multi Root Input Output Virtualization (MR-IOV), as the teachings of the present disclosure operate with the same root domain to ensure IO coherence with respect to an Input-Output Memory Management Unit (IOMMU) while providing separate cache resource allocation.

Furthermore, the present disclosure is being filed along with U.S. patent application Ser. No. 16/396,022, filed on Apr. 26, 2019, and directed to virtual machine deployment techniques; U.S. patent application Ser. No. 16/396,000, filed on Apr. 26, 2019, and directed to data splitting techniques; U.S. patent application Ser. No. 16/396,453, filed on Apr. 26, 2019, and directed to packet routing techniques; U.S. patent application Ser. No. 16/395,468, filed on Apr. 26, 2019, and directed to communication coupling configuration techniques; U.S. patent application Ser. No. 16/396,521, filed on Apr. 26, 2019, and directed to connection configuration techniques; and U.S. patent application Ser. No. 16/395,584, filed on Apr. 26, 2019, and directed to sideband communication techniques; each of which include embodiments that utilize the multi-processor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-endpoint adapter device, comprising:
 a processing system that includes a plurality of processing subsystems that each have a respective memory subsystem, wherein the respective memory subsystem for any one of the plurality of processing subsystems is accessible to one or more other processing subsystems via at least one processing subsystem interconnect that couples those processing subsystems together;
 a plurality of endpoint subsystems that are each configured to couple to at least one of the plurality of processing subsystems via a plurality of communication couplings;
 a network port; and
 a duplicator device that is coupled to the network port and the plurality of endpoint subsystems, wherein the duplicator device is configured to:
  receive, via the network port and in response to a request from a host application operated by the plurality of processing subsystems for a data payload stored on a server device, the data payload;
  determine that the data payload is to be provided to each of a first processing subsystem that is included in the plurality of processing subsystems via a first endpoint subsystem that is included in the plurality of endpoint subsystems, and a second processing subsystem that is included in the plurality of processing subsystems via a second endpoint subsystem that is included in the plurality of endpoint subsystems, wherein the data payload is to be provided to each of the first processing subsystem and the second processing subsystem without utilizing the at least one processing subsystem interconnect that couples the first processing subsystem to the second processing subsystem;
  duplicate the data payload to provide a first duplicated data payload and a second duplicated data payload;
  provide the first duplicated data payload to the first endpoint subsystem; and
  provide the second duplicated data payload to the second endpoint subsystem.

2. The multi-endpoint adapter device of claim 1, wherein the first endpoint subsystem is configured to:
 provide, via a first communication coupling that is included in the plurality of communication couplings and without utilizing the at one processing subsystem interconnect coupled to the first processing subsystem, the first duplicated data payload to the first processing subsystem.

3. The multi-endpoint adapter device of claim 1, wherein the second endpoint subsystem is configured to:
 provide, via a second communication coupling that is included in the plurality of communication couplings and without utilizing the at one processing subsystem interconnect coupled to the second processing subsystem, the second duplicated data payload to the second processing subsystem.

4. The multi-endpoint adapter device of claim 1, wherein the first endpoint subsystem is configured to:
 receive a first response that is associated with the first duplicated data payload; and
 provide, via the network port, the first response over a network.

5. The multi-endpoint adapter device of claim 4, wherein the second endpoint subsystem does not receive a second response that is associated with the second duplicated data payload.

6. The multi-endpoint adapter device of claim 4, wherein a second response that is associated with the second duplicated data payload is blocked before being provided on the network via the network port.

7. The multi-endpoint adapter device of claim 1, wherein the duplicator device is configured to:
 receive a duplication configuration from the host application, wherein the determining that the data payload is to be provided to each of the first processing subsystem that is included in the plurality of processing subsystems via the first endpoint subsystem that is included in the plurality of endpoint subsystems, and the second processing subsystem that is included in the plurality of processing subsystems via the second endpoint subsystem that is included in the plurality of endpoint subsystems, is based on the duplication configuration.

8. An information handling system (IHS), comprising:
 a processing system;

a memory system that is coupled to the processing system and that includes instructions that, when executed by the processing system, cause the processing system to provide a duplicator engine that is configured to:
- receive, via a network port and in response to a request from a host application running on a plurality of processing subsystems included in a primary processing system for a data payload that is stored on a server device, the data payload,
  - wherein the plurality of processing subsystems each have a respective memory subsystem, and
  - wherein the respective memory subsystem for any one of the plurality of processing subsystems is accessible to one or more other processing subsystems via at least one processing subsystem interconnect that couples those processing subsystems together;
- determine that the data payload is to be provided to each of a first processing subsystem via a first endpoint subsystem that is included in a plurality of endpoint subsystems that are provided by a multi-endpoint adapter device, and a second processing subsystem via a second endpoint subsystem that is included in the plurality of endpoint subsystems that are provided by the multi-endpoint adapter device, wherein the data payload is to be provided to each of the first processing subsystem and the second processing subsystem without utilizing the at least one processing subsystem interconnect that couples the first processing subsystem to the second processing subsystem;
- duplicate the data payload to provide a first duplicated data payload and a second duplicated data payload;
- provide the first duplicated data payload to the first endpoint subsystem; and
- provide the second duplicated data payload to the second endpoint subsystem.

9. The IHS of claim 8, wherein the first endpoint subsystem is configured to:
provide, via a first communication coupling that is included in a plurality of communication couplings and without utilizing the at one processing subsystem interconnect coupled to the first processing subsystem, the first duplicated data payload to the first processing subsystem.

10. The IHS of claim 9, wherein the second endpoint subsystem is configured to:
provide, via a second communication coupling that is included in the plurality of communication couplings and without utilizing the at one processing subsystem interconnect coupled to the second processing subsystem, the second duplicated data payload to the second processing subsystem.

11. The IHS of claim 8, wherein the duplicator engine is configured to:
receive a first acknowledgement that is associated with the first duplicated data payload; and
provide, via the network port, the first acknowledgement over a network.

12. The multi-endpoint adapter device of claim 11, wherein the duplicator engine does not provide a second acknowledgement that is associated with the second duplicated data payload.

13. The IHS of claim 8, wherein the duplicator engine is configured to:
receive a duplication configuration from the host application, wherein the determining that the data payload is to be provided to each of the first processing subsystem via the first endpoint subsystem that is included in the plurality of endpoint subsystems, and the second processing subsystem via the second endpoint subsystem that is included in the plurality of endpoint subsystems, is based on the duplication configuration.

14. A method for duplicating a network data stream, comprising:
providing, by a duplicator device via a network port, a request for a data payload that is stored on a server device, wherein the request is received by the duplicator device from a host application hosted on a plurality of processing systems,
  wherein the plurality of processing subsystems each have a respective memory subsystem, and
  wherein the respective memory subsystem for any one of the plurality of processing subsystems is accessible to one or more other processing subsystems via at least one processing subsystem interconnect that couples those processing subsystems together;
receiving, by the duplicator device via the network port and in response to the request, the data payload;
determining, by the duplicator device, that the data payload is to be provided to each of a first processing subsystem via a first endpoint subsystem that is included in a plurality of endpoint subsystems that are provided by a multi-endpoint adapter device, and a second processing subsystem via a second endpoint subsystem that is included in the plurality of endpoint subsystems that are provided by the multi-endpoint adapter device;
duplicating, by the duplicator device, the data payload to provide a first duplicated data payload and a second duplicated data payload, wherein the data payload is to be provided to each of the first processing subsystem and the second processing subsystem without utilizing the at least one processing subsystem interconnect that couples the first processing subsystem to the second processing subsystem;
providing, by the duplicator device, the first duplicated data payload to the first endpoint subsystem; and
providing, by the duplicator device, the second duplicated data payload to the second endpoint subsystem.

15. The method of claim 14, further comprising:
providing, by the first endpoint subsystem via a first communication coupling that is included in a plurality of communication couplings and without utilizing the at one processing subsystem interconnect coupled to the first processing subsystem, the first duplicated data payload to the first processing subsystem.

16. The method of claim 15, further comprising:
providing, by the second endpoint subsystem via a second communication coupling that is included in the plurality of communication couplings and without utilizing the at one processing subsystem interconnect coupled to the first processing subsystem, the second duplicated data payload to the second processing subsystem.

17. The method of claim 14, further comprising:
receiving, by the first endpoint subsystem, a first acknowledgement that is associated with the first duplicated data payload; and
providing, by the first endpoint subsystem via the network port, the first acknowledgement over a network.

18. The method of claim 17, wherein the second endpoint subsystem does not receive a second response that is associated with the second duplicated data payload.

19. The method of claim 17, wherein a second response that is associated with the second duplicated data payload is blocked before being provided on the network via the network port.

20. The method of claim 14, further comprising:

receiving, by the duplicator device, a duplication configuration from the host application, wherein the determining that the data payload is to be provided to each of the first processing subsystem via the first endpoint subsystem that is included in the plurality of endpoint subsystems, and the second processing subsystem via the second endpoint subsystem that is included in the plurality of endpoint subsystems, is based on the duplication configuration.

* * * * *